US010691197B2

(12) United States Patent
Yoneda et al.

(10) Patent No.: US 10,691,197 B2
(45) Date of Patent: Jun. 23, 2020

(54) INFORMATION PRESENTING APPARATUS AND CONTROL METHOD THEREFOR

(71) Applicant: Panasonic Intellectual Property Corporation of America, Torrance, CA (US)

(72) Inventors: Aki Yoneda, Hyogo (JP); Koichi Kusukame, Nara (JP); Shinichi Shikii, Nara (JP); Nawatt Silawan, Osaka (JP); Shinji Uchida, Osaka (JP); Tatsuo Itoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/277,450

(22) Filed: Sep. 27, 2016

(65) Prior Publication Data

US 2017/0102765 A1    Apr. 13, 2017

Related U.S. Application Data

(60) Provisional application No. 62/238,878, filed on Oct. 8, 2015.

(30) Foreign Application Priority Data

May 2, 2016    (JP) .................................. 2016-092835

(51) Int. Cl.
G06F 3/01        (2006.01)
G06F 3/03        (2006.01)
(Continued)

(52) U.S. Cl.
CPC .......... G06F 3/011 (2013.01); G01C 21/3484 (2013.01); G06F 3/0304 (2013.01);
(Continued)

(58) Field of Classification Search
CPC ................................... G06F 3/013; G06F 3/14
See application file for complete search history.

(56) References Cited

U.S. PATENT DOCUMENTS 4,931,865 A * 6/1990 Scarampi ............... A61B 3/113
            348/E7.07
6,190,314 B1 * 2/2001 Ark .......................... A61B 5/16
            463/36

(Continued)

FOREIGN PATENT DOCUMENTS

JP    2007-269268 A    10/2007
JP    2008-070965 A    3/2008
(Continued)

Primary Examiner — Olga V Merkoulova
(74) Attorney, Agent, or Firm — Greenblum & Bernstein, P.L.C.

(57) ABSTRACT

A control method for an information presenting apparatus includes: estimating an emotion felt by a user, based on a physical quantity acquired by a sensor; generating identification information that identifies a cause that causes the user to feel the estimated emotion, based on the physical quantity acquired by the sensor or information that a presenter included in the information presenting apparatus presents to the user; and controlling presentation performed by the information presenting apparatus, by using information obtained by executing predetermined processing using the estimated emotion and the generated identification information.

16 Claims, 20 Drawing Sheets

| | SENTIMENT ESTIMATOR | | | OPERATION DETERMINER | T1 |
|---|---|---|---|---|---|
| EMOTION | DIRECTION OF LINE-OF-SIGHT (CAUSE) | ROAD SITUATION | ESTIMATED SENTIMENT | OPERATION | |
| NEGATIVE | DOWNWARD (DISPLAY PANEL) | CONGESTED | DISLIKE TRAFFIC JAMS ANOTHER ROUTE? | SEARCH FOR ALTERNATIVE WAY | |
| | | NOT CONGESTED | DISLIKE CURRENT ROUTE ANOTHER ROUTE? | ASK CONDITION FOR RE-SEARCHING | |
| | FRONTWARD (SCENERY IN TRAVELING DIRECTION) | CONGESTED | IRRITATED BY TRAFFIC JAM | DISPLAY HOW LONG IT TAKES FOR TRAFFIC JAM TO END | |
| | | NOT CONGESTED | VEHICLE AHEAD IS ANNOYING | PLAY RELAXING MUSIC | |
| | SIDEWARD (SITUATION OF SURROUNDINGS) | FIVE-LANE ROAD | IRRITATED SINCE LANE CHANGE CANNOT BE MADE | ALERT | |
| | | RESTAURANT DISTRICT | IRRITATED BECAUSE OF BEING HUNGRY | NAVIGATE TO RESTAURANT WITH SPACIOUS PARKING LOT | |
| | | OTHERS | IRRITATED FOR NO PARTICULAR REASON | PLAY RELAXING MUSIC | |
| POSITIVE | DOWNWARD (DISPLAY PANEL) | TV PLAYING | SMILING SINCE TV PROGRAM IS INTERESTING | ALERT | |
| | | OTHERS | N/A | — | |
| | FRONTWARD (SCENERY IN TRAVELING DIRECTION) | CONGESTED | CAN'T WAIT TO ARRIVE AT DESTINATION | DISPLAY INFORMATION ABOUT SURROUNDINGS OF DESTINATION | |
| | | NOT CONGESTED | FUN TO DRIVE | LEARN PREFERRED ROADS AND UTILIZE THE ROADS FOR NEXT ROUTE SEARCHING | |
| | SIDEWARD (SITUATION OF SURROUNDINGS) | SCENIC SPOT NEARBY | FUN TO SEE SCENIC SPOT | DISPLAY INFORMATION ABOUT SCENIC SPOT. LEARN PREFERRED SCENIC SPOT | |
| | | OTHERS | N/A | — | |

(51) Int. Cl.
*G01C 21/34* (2006.01)
*G06Q 30/06* (2012.01)
*G06Q 30/02* (2012.01)
*G06F 3/16* (2006.01)
*G06K 9/00* (2006.01)
*G06F 40/30* (2020.01)

(52) U.S. Cl.
CPC ..... *G06Q 30/0269* (2013.01); *G06Q 30/0623* (2013.01); *G06F 3/16* (2013.01); *G06F 40/30* (2020.01); *G06F 2203/011* (2013.01); *G06K 9/00302* (2013.01)

(56) References Cited

U.S. PATENT DOCUMENTS

| | | | | |
|---|---|---|---|---|
| 6,275,806 | B1* | 8/2001 | Pertrushin | G10L 17/26 |
| | | | | 704/270 |
| 7,181,693 | B1* | 2/2007 | Anderson | G06F 3/011 |
| | | | | 715/745 |
| 8,154,615 | B2* | 4/2012 | Fedorovskaya | G06Q 30/02 |
| | | | | 348/222.1 |
| 9,311,825 | B2* | 4/2016 | Lusted | G09B 19/00 |
| 10,169,827 | B1* | 1/2019 | Paulus | G06Q 40/123 |
| 10,496,947 | B1* | 12/2019 | Shaburov | G06Q 10/06393 |
| 2008/0117323 | A1* | 5/2008 | Sakamoto | G06F 3/011 |
| | | | | 348/333.01 |
| 2009/0112656 | A1* | 4/2009 | Jung | G06Q 30/02 |
| | | | | 705/7.32 |
| 2010/0328492 | A1* | 12/2010 | Fedorovskaya | G06K 9/4671 |
| | | | | 348/231.2 |
| 2013/0121591 | A1* | 5/2013 | Hill | G06K 9/46 |
| | | | | 382/195 |
| 2015/0078632 | A1* | 3/2015 | Hachisuka | G06K 9/00308 |
| | | | | 382/118 |
| 2015/0378433 | A1* | 12/2015 | Savastinuk | G06K 9/00255 |
| | | | | 345/156 |
| 2016/0131905 | A1* | 5/2016 | Takahashi | G02B 27/0176 |
| | | | | 345/8 |
| 2016/0379047 | A1* | 12/2016 | Natan | G06K 9/00281 |
| | | | | 382/201 |
| 2017/0102765 | A1* | 4/2017 | Yoneda | G06F 3/011 |
| 2017/0102783 | A1* | 4/2017 | Shikii | G06F 3/0304 |

FOREIGN PATENT DOCUMENTS

| | | |
|---|---|---|
| JP | 2009-018047 | 1/2009 |
| JP | 2012-079330 A | 4/2012 |
| JP | 2015-111357 A | 6/2015 |
| JP | 2015-130045 A | 7/2015 |

* cited by examiner

FIG. 6

| EMOTION | SENTIMENT ESTIMATOR | | | OPERATION DETERMINER |
|---|---|---|---|---|
| | DIRECTION OF LINE-OF-SIGHT (CAUSE) | ROAD SITUATION | ESTIMATED SENTIMENT | OPERATION |
| NEGATIVE | DOWNWARD (DISPLAY PANEL) | CONGESTED | DISLIKE TRAFFIC JAMS ANOTHER ROUTE? | SEARCH FOR ALTERNATIVE WAY |
| | | NOT CONGESTED | DISLIKE CURRENT ROUTE ANOTHER ROUTE? | ASK CONDITION FOR RE-SEARCHING |
| | FRONTWARD SCENERY IN (TRAVELING DIRECTION) | CONGESTED | IRRITATED BY TRAFFIC JAM | DISPLAY HOW LONG IT TAKES FOR TRAFFIC JAM TO END |
| | | NOT CONGESTED | VEHICLE AHEAD IS ANNOYING | PLAY RELAXING MUSIC |
| | SIDEWARD (SITUATION OF SURROUNDINGS) | FIVE-LANE ROAD | IRRITATED SINCE LANE CHANGE CANNOT BE MADE | ALERT |
| | | RESTAURANT DISTRICT | IRRITATED BECAUSE OF BEING HUNGRY | NAVIGATE TO RESTAURANT WITH SPACIOUS PARKING LOT |
| | | OTHERS | IRRITATED FOR NO PARTICULAR REASON | PLAY RELAXING MUSIC |
| POSITIVE | DOWNWARD (DISPLAY PANEL) | TV PLAYING | SMILING SINCE TV PROGRAM IS INTERESTING | ALERT |
| | | OTHERS | N/A | — |
| | FRONTWARD SCENERY IN (TRAVELING DIRECTION) | CONGESTED | CAN'T WAIT TO ARRIVE AT DESTINATION | DISPLAY INFORMATION ABOUT SURROUNDINGS OF DESTINATION |
| | | NOT CONGESTED | FUN TO DRIVE | LEARN PREFERRED ROADS AND UTILIZE THE ROADS FOR NEXT ROUTE SEARCHING |
| | SIDEWARD (SITUATION OF SURROUNDINGS) | SCENIC SPOT NEARBY | FUN TO SEE SCENIC SPOT | DISPLAY INFORMATION ABOUT SCENIC SPOT. LEARN PREFERRED SCENIC SPOT |
| | | OTHERS | N/A | — |

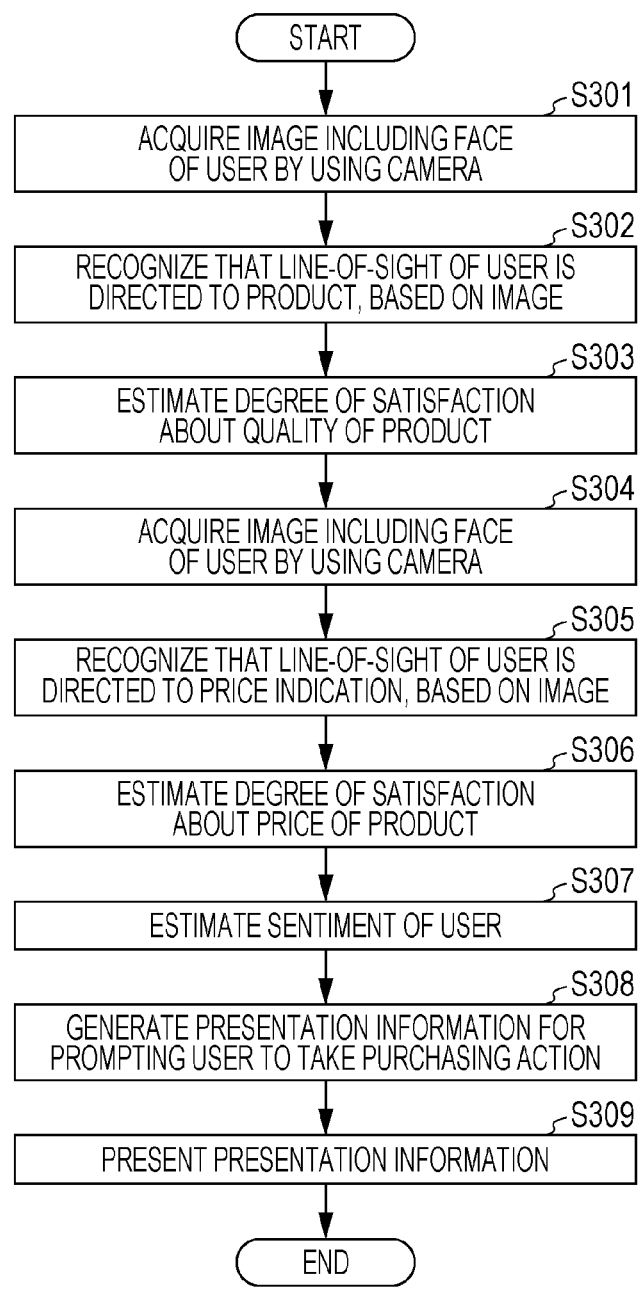

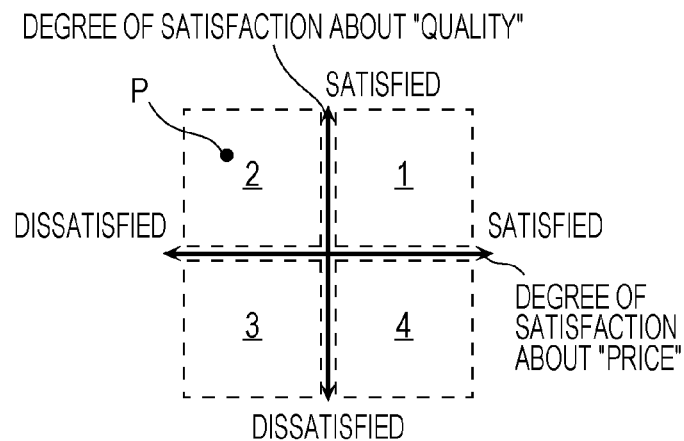

| QUADRANT | SENTIMENT OF USER |
|---|---|
| 1 | SATISFIED WITH BOTH QUALITY AND PRICE |
| 2 | SATISFIED WITH QUALITY AND DISSATISFIED WITH PRICE |
| 3 | DISSATISFIED WITH BOTH QUALITY AND PRICE |
| 4 | SATISFIED WITH PRICE AND DISSATISFIED WITH QUALITY |

CORRESPOND TO POINT P

FIG. 12

| QUADRANT | CUSTOMER SERVICE POLICY | SPECIFIC EXAMPLE |
|---|---|---|
| 1 | PRESENT ANOTHER PRODUCT THAT MATCHES TARGET PRODUCT | PRESENT SHIRT THAT GOES WITH PRODUCT 51 (JEANS) |
| 2 | SOLVE PROBLEM WITH PRICE | PROPOSE GIVING DISCOUNT OR COUPON |
| 3 | PRESENT LESS-EXPENSIVE PRODUCT OF SAME TYPE | PRESENT JEANS LESS EXPENSIVE THAN PRODUCT 51 (JEANS) |
| 4 | PRESENT MORE-EXPENSIVE PRODUCT OF SAME TYPE | PRESENT JEANS MORE EXPENSIVE THAN PRODUCT 51 (JEANS) |

CORRESPOND TO POINT P

FIG. 18

| ATTRIBUTE OF FOOD | FOOD A | FOOD B | COMPONENT OF PREFERENCE VECTOR |
|---|---|---|---|
| MEAT | 0.8 | 0.2 | 0.74 |
| VEGETABLE | 0.1 | 0.8 | 0.17 |
| SWEETNESS | 0.3 | 0.2 | 0.29 |
| BITTERNESS | 0.7 | 0.2 | 0.65 |
| SOURNESS | 0.2 | 0.8 | 0.26 |
| UMAMI | 0.7 | 0.1 | 0.64 |

DEGREE OF FONDNESS FOR FOOD A : DEGREE OF FONDNESS FOR FOOD B = 0.9:0.1

FIG. 19

| ATTRIBUTE OF FOOD | FOOD C | FOOD D |
|---|---|---|
| MEAT | 0.9 | 0.4 |
| VEGETABLE | 0.5 | 0.6 |
| SWEETNESS | 0.2 | 0.1 |
| BITTERNESS | 0.6 | 0.5 |
| SOURNESS | 0.1 | 0.7 |
| UMAMI | 0.9 | 0.1 |
| VALUE OF INNER PRODUCT WITH PREFERENCE VECTOR | 1.801 | 0.998 |

| RACE | LANGUAGE (ORDER) | |
|---|---|---|
| WHITE RACE | 1 | ENGLISH |
| | 2 | FRENCH |
| | ... | ... |
| YELLOW RACE | 1 | CHINESE |
| | 2 | JAPANESE |
| | ... | ... |

| LANGUAGE (ORDER) | |
|---|---|
| 1 | ENGLISH |
| 2 | CHINESE |
| ... | ... | ern
INFORMATION PRESENTING APPARATUS AND CONTROL METHOD THEREFOR

BACKGROUND

1. Technical Field

The present disclosure relates to an information presenting apparatus and a control method therefor.

2. Description of the Related Art

An apparatus has been disclosed that gives a stimulus to a human subject in advance, learns a change in biometric information of the subject in response to to the given stimulus, and estimates a psychological state of the subject on the basis of the learned change in the biometric information (see Japanese Unexamined Patent Application Publication No. 2009-18047).

SUMMARY

One non-limiting and exemplary embodiment provides a control method for an information presenting apparatus and so on that present information more suitable for a user on the basis of an estimated emotion.

In one general aspect, the techniques disclosed here feature a control method for an information presenting apparatus. The control method includes: estimating an emotion felt by a user, based on a physical quantity acquired by a sensor; generating identification information that identifies a cause that causes the user to feel the estimated emotion, based on the physical quantity acquired by the sensor or information that a presenter included in the information presenting apparatus presents to the user; and controlling presentation performed by the information presenting apparatus, by using information obtained by executing predetermined processing using the estimated emotion and the generated identification information.

It should be noted that general or specific embodiments may be implemented as a system, a method, an integrated circuit, a computer program, a computer-readable storage medium such as a compact disc read-only memory (CD-ROM), or any selective combination thereof.

The control method for the information presenting apparatus in the present disclosure can present information more suitable for a user on the basis of an estimated emotion.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an operation determination table used for determining an operation to be performed by the information presenting apparatus in the second embodiment;

FIG. 9 is a flow diagram illustrating a control method for the information presenting apparatus in the third embodiment;

FIG. 10 is a graph illustrating a method for analyzing a customer situation in the third embodiment;

FIG. 11 is a table illustrating customer situations in the third embodiment;

FIG. 12 is a table illustrating customer service policies in the third embodiment;

FIG. 18 is a table for describing a method for deriving a preference vector in the fourth embodiment;

FIG. 19 is a table for describing a method for determining a food in the fourth embodiment;

FIG. 24 illustrates one example of a language selection table in the fifth embodiment; and FIG. 25 illustrates a modification of the language selection table in the fifth embodiment.

DETAILED DESCRIPTION (Knowledge Underlying Present Disclosure)

Figure 1:
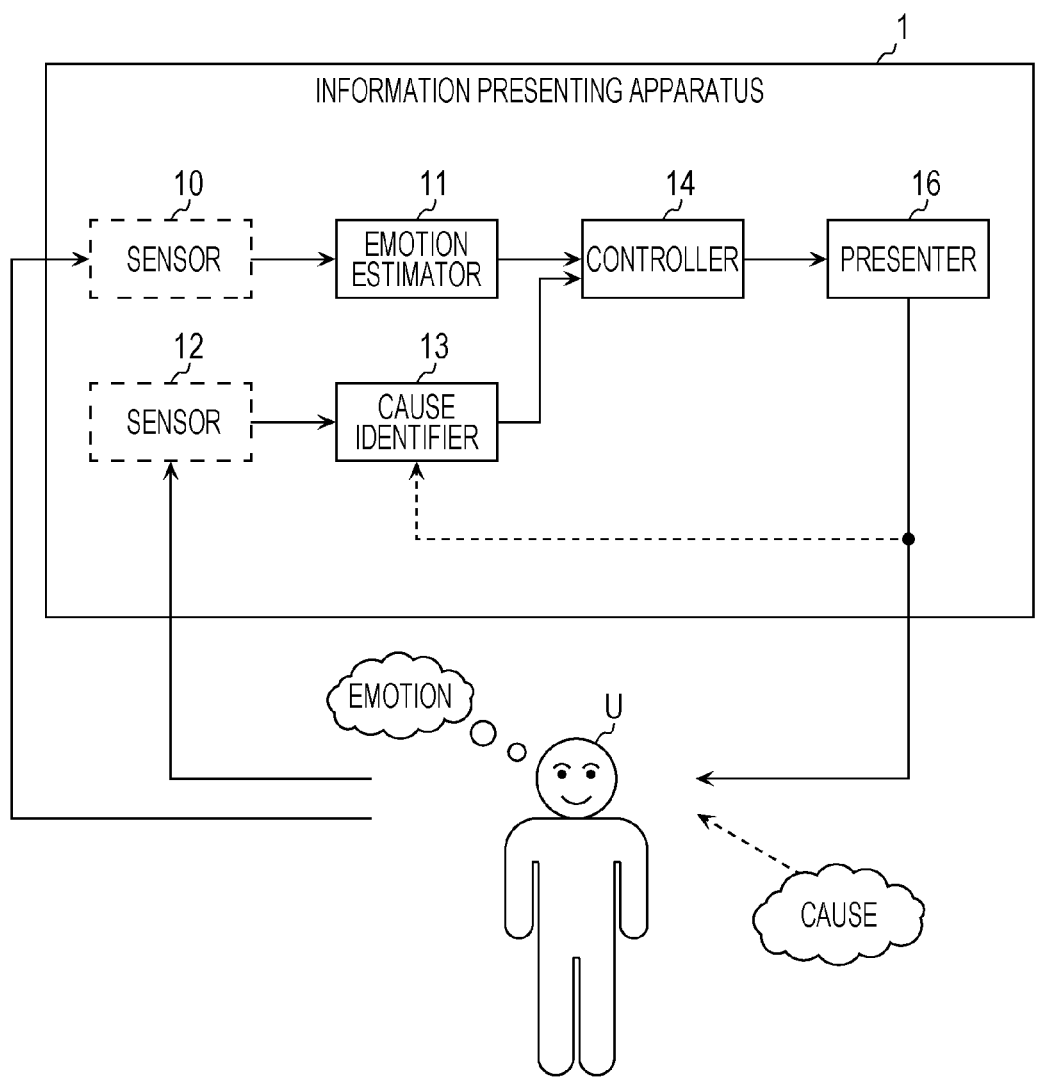
FIG. 1 is a block diagram illustrating functional blocks in an information presenting apparatus in a first embodiment.

The apparatus disclosed in Japanese Unexamined Patent Application Publication No. 2009-18047 merely estimates the psychological state of a human subject.

When the psychological state of the subject is merely estimated, a cause by which an actual user or the like is put into a certain psychological state is unclear, and thus there is a problem in that services that can be provided to the user or the like are limited.

Accordingly, the present disclosure provides a control method for an information presenting apparatus and so on that present information more suitable for a user on the basis of an estimated emotion.

A control method for an information presenting apparatus according to one aspect of the present disclosure includes:

estimating an emotion felt by a user, based on a physical quantity acquired by a sensor; generating identification information that identifies a cause that causes the user to feel the estimated emotion, based on the physical quantity acquired by the sensor or information that a presenter included in the information presenting apparatus presents to the user; and controlling presentation performed by the information presenting apparatus, by using information obtained by executing predetermined processing using the estimated emotion and the generated identification information.

According to the above-described aspect, the information presenting apparatus obtains the emotion of the user and the cause that causes the user to feel the emotion, and presents information based on the obtained emotion and cause. Since the information presenting apparatus obtains not only the emotion of the user but also the cause that causes the user to feel the emotion, it is possible to present more appropriate information to the user, compared with a case in which only the emotion of the user is obtained. Thus, the information presenting apparatus can present information more suitable for the user on the basis of the estimated emotion.

It is also possible to envisage an apparatus for estimating a user's emotion caused by a pre-defined cause. However, such an apparatus merely estimates the emotion of the user about the pre-defined cause, that is, does not estimate an emotion about a cause other than the pre-defined cause, thus still limiting services that can be provided. The information presenting apparatus according to the present disclosure can estimate an emotion of the user, can perform processing for identifying the cause of the emotion, and can present more appropriate information to the user on the basis of the emotion and the cause.

For example, in the executing of the predetermined processing, the information may be obtained by executing selection processing for selecting one piece of information from a table in which one or more sets, each including an emotion felt by a person and a cause that causes the person to feel the emotion, are associated with respective pieces of candidate information or by executing generation processing for generating information through use of an emotion felt by the user and the cause that causes the user to feel the emotion.

According to the above-described aspect, the information presenting apparatus can generate information for more specifically controlling presentation by using the selection processing and the generation processing.

For example, the emotion may include a positive emotion and a negative emotion; in the executing of the predetermined processing, presentation information to be presented to the user in order to eliminate the cause may be obtained when the estimated emotion is a negative emotion, and presentation information to be presented to the user in order to maintain the emotion may be obtained when the estimated emotion is a positive emotion; and in the controlling of the presentation, the obtained presentation information may be presented by the information presenting apparatus.

According to the above-described aspect, the information presenting apparatus presents, to the user, information for changing or maintaining the emotion of the user on the basis of the emotion of the user and the cause. Specifically, when the emotion of the user is negative, and it is thought to be not appropriate for the user to maintain the emotion, the information presenting apparatus presents, to the user, information for eliminating the cause of the emotion. On the other hand, when the emotion of the user is positive, and it is thought to be good for the user to maintain the emotion, the information presenting apparatus presents, to the user, information for maintaining the emotion of the user. Thus, the information presenting apparatus can present information more suitable for the user.

For example, the information presenting apparatus may be a vehicle navigation apparatus. The navigation apparatus may have a memory storing a table in which one or more sets, each including an emotion felt by a person and information indicating a direction of line-of-sight of the person, are associated with respective pieces of control information regarding road navigation or sound output performed by the navigation apparatus. In the generating of the identification information, the identification information may be generated based on information that is obtained from an image acquired by a camera serving as the sensor and that indicates a direction of line-of-sight of the user, the physical quantity being provided by the image. In the executing of the predetermined processing, the information may be obtained by selecting the control information associated in the table with a set of the estimated emotion and the cause identified with the generated identification information. In the controlling of the presentation, road navigation or sound output performed by the navigation apparatus are controlled in accordance with the selected control information.

According to the above-described aspect, the information presenting apparatus serves as a vehicle navigation apparatus and presents information obtained based on the emotion of a user and the direction of the line-of-sight of the user. In general, the line-of-sight of the user is directed to a thing that is a cause of the emotion. Hence, not only is the emotion of the user estimated, but also a cause that causes the user to feel the emotion is identified based on the direction of the line-of-sight of the user, thereby making it possible to present more appropriate information, compared with a case in which only the emotion is estimated.

For example, in the table, the control information for the navigation apparatus may be associated with sets, each including the emotion felt by the person, the information indicating the direction of the line-of-sight of the person, and information regarding a road situation acquired by the navigation apparatus; and in the predetermined processing, the navigation apparatus may obtain road information regarding the road situation, and the control information may be obtained by selecting the control information associated in the table with the set of the estimated emotion, the cause identified with the generated identification information, and the obtained road information.

According to the above-described aspect, the information presenting apparatus can present appropriate information to the user, on the basis of not only the emotion of the user and the direction of the line-of-sight but also the road situation.

For example, the cause may be one of a quality of a product and a price of the product; in the generating of the identification information, the identification information may be generated based on whether the product lies on an extension of line-of-sight of the user or a price indication for the product lies on an extension of the line-of-sight of the user and indicates at least one of the quality and the price, the line-of-sight being obtained from an image acquired by a camera serving as the sensor, and the physical quantity being provided by the image; in the executing of the predetermined processing, the information may be obtained by generating presentation information for prompting the user to take a purchasing action, based on the estimated emotion and the generated identification information; and in the controlling of the presentation, the generated presentation information may be presented.

According to the above-described aspect, the information presenting apparatus serves as as an apparatus for presenting a customer service and presents, to the user, information obtained based on a user's emotion about the quality and the price indication of a product. In general, each user takes a purchasing action when he or she is satisfied with both the quality and the price of a product, and does not take a purchasing action unless he or she is satisfied with at least one of the quality and the price of the product. Accordingly, each user's emotions about both the quality and the price of a product are analyzed, and information for prompting the user to take a purchasing action is generated, thereby offering an advantage in that the possibility that the user purchases the product increases.

For example, in the estimating of the emotion and in the generating of the identification information, (a) a degree of satisfaction felt by the user about the quality that is the cause may be estimated as the emotion, and information indicating the quality is generated as the identification information, and (b) a degree of satisfaction felt by the user about the price that is the cause may be estimated as the emotion, and information indicating the price is generated as the identification information; and in the executing of the predetermined processing, based on the emotions estimated in (a) and (b) and the generated identification information, presentation information to be presented to the user in order to prompt the user's purchasing action may be generated.

According to the above-described aspect, on the basis of the degrees of the user's satisfaction about the quality and the price of a product, the information presenting apparatus obtains information that allows the user to be satisfied with the price and/or the product he or she is not satisfied, and provides the obtained information to him or her. This makes it possible to, specifically, prompt the user to take a purchasing action.

For example, the cause may be any of the first foods; in the estimating of the emotion, a degree of fondness felt by the user about each of the first foods may be estimated as the emotion; in the generating of the identification information, information that is obtained from an image acquired by a camera serving as the sensor and that indicates which of the first foods the user brought to his or her mouth, the physical quantity being provided by the image, may be generated as the identification information; in the executing of the predetermined processing, the information may be obtained by generating presentation information including, with higher priority, a second food having an attribute that is close to preference of the user, the preference being determined based on a degree of fondness felt by the user, the second food being included in a plurality of second foods that are candidates of a food to be served to the user; and in the controlling of the presentation, the generated presentation information may be presented.

According to the above-described aspect, the information presenting apparatus serves as an apparatus for presenting a food to be served to a user, analyzes preference of the user on the basis of the emotion of the user and a food the user brings to his or her mouth, and presents information indicating a food that is relatively close to the preference of the user. Thus, the information presenting apparatus can improve the emotion of the user.

For example, the information presenting apparatus may have a memory in which attribute values of respective attributes of each of the first foods are stored; and in the executing of the predetermined processing, a preference vector whose components are the user's preferences for the respective attributes of each of the first foods may be derived based on a degree of fondness felt by the user about each of the first foods, and the presentation information may include, with higher priority, the second food that is included in the plurality of second foods and for which a value of inner product between the preference vector and an attribute vector whose components are attribute values of respective attributes of each of the second foods is small.

According to the above-described aspect, the information presenting apparatus can specifically analyze preference of the user by performing vector computational operation using the attribute values of respective attributes of each food and can determine a food to be served.

For example, the cause may be speech data using one language, the speech data being presented to the user by the presenter through speech output; in the estimating of the emotion, a degree of understanding indicated by the user about the speech data presented by the presenter may be estimated as the emotion; in the generating of the identification information, information that identifies the speech data presented by the presenter may be generated as the identification information; in the executing of the predetermined processing, when the estimated degree of understanding is smaller than a predetermined degree, speech data using a language different from the one language may be obtained; and in the controlling of the presentation, the obtained speech data may be presented by the presenter through speech output.

According to the above-described aspect, the information presenting apparatus serves as an apparatus for performing speech guidance using a plurality of languages, can determine a language that can be understood by a user on the basis of an emotion of the user about a language, and can perform speech guidance. In this case, when the information presenting apparatus uses the estimated emotion of the user about the language presented to the user, it is possible to more appropriately determine the language the user can understand.

For example, the information presenting apparatus may have a memory in which pieces of speech guidance data, each piece using one language, are stored; and in the executing of the predetermined processing, (a) when the estimated degree of understanding is smaller than a predetermined degree, a piece of speech guidance data using a language different from the one language of the speech guidance data presented by the presenter may be selected and obtained, the piece of speech guidance data being included in the pieces of speech guidance data stored in the memory, and (b) when the estimated degree of understanding is larger than or equal to the predetermined degree, it may be determined that the one language presented by the presenter is a language the user can understand.

According to the above-described aspect, the information presenting apparatus can specifically determine a language the user can understand, on the basis of the degree of understanding of the user about a language.

An information presenting apparatus according to one aspect of the present disclosure includes: an emotion estimator that estimates an emotion felt by a user, based on a physical quantity acquired by a sensor; a cause identifier that generates identification information that identifies a cause that causes the user to feel the estimated emotion, based on the physical quantity acquired by the sensor and information presented to the user by the information presenting apparatus; and a controller that controls presentation performed by the information presenting apparatus, by using information obtained by executing predetermined processing using the estimated emotion and the generated identification information.

This information presenting apparatus offers advantages that are the same as or similar to those described above.

It should be noted that general or specific embodiments may be implemented as a system, a method, an integrated circuit, a computer program, a computer-readable storage medium such as a CD-ROM, or any selective combination thereof.

Embodiments will be described below in detail with reference to the accompanying drawings.

The embodiments described below each represent a comprehensive or specific example. Numerical values, shapes, materials, constituent elements, the arrangement position and the connections of constituent elements, steps, the order of steps, and so on described below in the embodiments are examples and are not intended to limit the present disclosure. Of the constituent elements in the embodiments described below, the constituent elements not set forth in the independent claims that represent the broadest concept will be described as optional constituent elements.

First Embodiment

In a first embodiment, a description will be given of an information presenting apparatus and so on that present information more suitable for a user on the basis of an estimated emotion.

FIG. 1 is a block diagram illustrating functional blocks in an information presenting apparatus 1 in the present embodiment.

As illustrated in FIG. 1, an information presenting apparatus 1 includes an emotion estimator 11, a cause identifier 13, a controller 14, and a presenter 16. The information presenting apparatus 1 may also include sensors 10 and 12.

The sensor 10 is one example of a sensor used by the emotion estimator 11. Specific examples of the sensor 10 include a camera for acquiring an image through image capture using a visible ray or infrared light, a heart-rate monitor, and a sphygmomanometer. The sensor 10 is not an essential constituent element of the information presenting apparatus 1.

The emotion estimator 11 is a processor that estimates an emotion felt by a user U on the basis of a physical quantity acquired by the sensor. Although the sensor used by the emotion estimator 11 is, for example, the sensor 10, the present disclosure is not limited thereto. The emotion estimator 11 may also obtain a physical quantity acquired by a sensor from outside of the information presenting apparatus 1. The emotion estimator 11 can estimate an emotion felt by the user U, for example, by analyzing a facial expression of the user U in the image acquired through image capture performed by the camera serving as the sensor, the physical quantity being provided by the image. In this case, a known technique can be used for a method for obtaining the emotion by analyzing the facial expression (more specifically, the positions of feature points of parts, such as the eyes, the mouth, and the nose).

The sensor 12 is one example of a sensor used by the cause identifier 13. One specific example of the sensor 12 is a camera for acquiring an image through image capture using a visible ray or infrared light. The sensor 12 is not an essential constituent element of the information presenting apparatus 1.

The cause identifier 13 is a processor that identifies a cause that causes the user U to feel the emotion estimated by the emotion estimator 11 on the basis of the physical quantity acquired by the sensor or information presented to the user U by the presenter 16 included in the information presenting apparatus 1. Although the sensor used by the cause identifier 13 is, for example, the sensor 12, the present disclosure is not limited thereto. The cause identifier 13 may also obtain a physical quantity acquired by a sensor from outside of the information presenting apparatus 1. The cause identifier 13 identifies the cause, for example, by analyzing the direction of line-of-sight of the user U in the image acquired through image capture performed by the camera serving as the sensor, the physical quantity being provided by the image. A known technique can be used for a method for analyzing the direction of the line-of-sight of the user U on the basis of the image.

The controller 14 is a processor that controls presentation performed by the information presenting apparatus 1, that is, presentation performed by the presenter 16, by using information obtained by executing predetermined processing using the emotion estimated by the emotion estimator 11 and identification information (described below) generated by the cause identifier 13.

The presenter 16 is an output interface that presents predetermined information in accordance with control performed by the controller 14. Specifically, the presenter 16 performs presentation by displaying an image on a display screen (not illustrated) or outputting sound via a speaker.

The information presenting apparatus 1 includes a processor (not illustrated). Some or all of the emotion estimator 11, the cause identifier 13, the controller 14, and the presenter 16 may be realized in software by the processor executing a program or may be realized in hardware including a dedicated circuit. It is also assumed that information that the above-described constituent elements use for processing is stored in a memory (not illustrated) or a storage (not illustrated) included in the information presenting apparatus 1.

Figure 2:
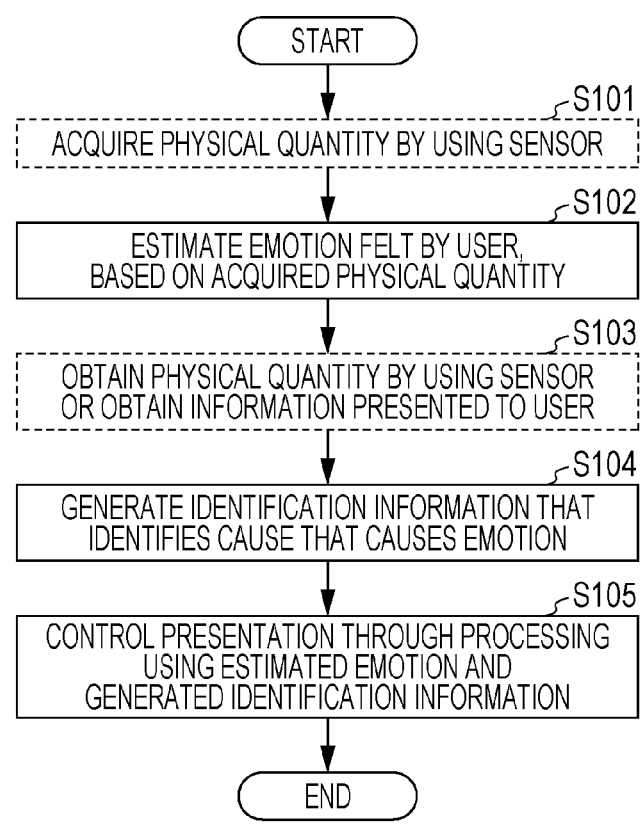
FIG. 2 is a flow diagram illustrating a control method for the information presenting apparatus in the first embodiment.

FIG. 2 is a flow diagram illustrating a control method for the information presenting apparatus 1 in the present embodiment.

In step S101, the sensor 10 acquires a physical quantity. A sensor external to the information presenting apparatus 1 may be used instead of the sensor 10, in which case, in step S101, the information presenting apparatus 1 obtains a physical quantity acquired by the external sensor.

In step S102, the emotion estimator 11 estimates an emotion felt by the user U, on the basis of the physical quantity acquired by the sensor 10 (or the external sensor).

In step S103, the sensor 12 acquires a physical quantity. In the same manner as described above, a sensor external to the information presenting apparatus 1 may be used instead of the sensor 12, in which case, in step S103, the information presenting apparatus 1 obtains a physical quantity acquired by the external sensor.

In step S104, on the basis of the physical quantity acquired by the sensor 12 (or the external sensor) or information presented to the user U by the presenter 16, the cause identifier 13 generates identification information that identifies a cause that causes the user U to feel the emotion estimated in step S102.

In step S105, the controller 14 controls presentation performed by the information presenting apparatus 1, by using information obtained by executing predetermined processing using the emotion estimated in step S102 and the identification information generated in step S104.

In the executing of the predetermined processing, presentation information for changing the emotion of the user U from the estimated emotion or for maintaining the emotion of the user U may be obtained as the above-described information. In this case, in the controlling of the presentation, the information presenting apparatus 1 (the presenter 16) presents the obtained presentation information.

In the executing of the predetermined processing, the above-described information may be obtained by executing selection processing for selecting one piece of information from a table in which one or more sets, each including an emotion felt by a person and a cause that causes the person to feel the emotion, are associated with respective pieces of candidate information or by executing generation processing for generating information through use of an emotion felt by the user and a cause that causes the user U to feel the emotion. In the generation processing, the information is generated according to a predetermined algorithm by using the emotion felt by the user U and the cause of the emotion.

Also, the emotion may include a positive emotion and a negative emotion, and in the executing of the predetermined processing, presentation information to be presented to the user U in order to eliminate the cause may be obtained when the estimated emotion is a negative emotion, and presentation information to be presented to the user U in order to maintain the emotion may be obtained when the estimated emotion is a positive emotion. In this case, in the controlling of the presentation, the obtained presentation information may be presented by the information presenting apparatus 1. The "presentation information to be presented to the user U in order to eliminate the cause" can also be referred to as "information for changing a negative emotion of the user U to a positive emotion".

As described above, the information presenting apparatus 1 in the present embodiment obtains an emotion of the user and a cause that causes the user to feel the emotion and presents information based on the obtained emotion and cause. In this case, since the information presenting apparatus 1 obtains not only the emotion of the user but also the cause that causes the user to feel the emotion, more appropriate information can be presented to the user, compared with a case in which only the emotion of the user is obtained. Thus, the information presenting apparatus 1 can present information more suitable for the user, on the basis of the estimated emotion.

The information presenting apparatus 1 can also generate information for more specifically controlling the presentation, by using the selection processing or the generation processing.

The information presenting apparatus 1 also presents, to the user, information for changing or maintaining the emotion of the user, on the basis of the emotion of the user and the cause. Specifically, when the emotion of the user is negative, and it is thought to be not appropriate for the user to maintain the emotion, the information presenting apparatus 1 presents, to the user, information for eliminating the cause of the emotion. On the other hand, when the emotion of the user is positive, and it is thought to be good for the user to maintain the emotion, the information presenting apparatus 1 presents, to the user, information for maintaining the emotion of the user. Thus, the information presenting apparatus 1 can present information more suitable for the user.

Second Embodiment

An information presenting apparatus and so on that present information more suitable for a user on the basis of an estimated emotion will be described in more detail in a second embodiment. An information presenting apparatus 2 in the present embodiment is an example in which the configuration and the processing of the information presenting apparatus 1 in the first embodiment are applied to a vehicle navigation apparatus.

Figure 3:
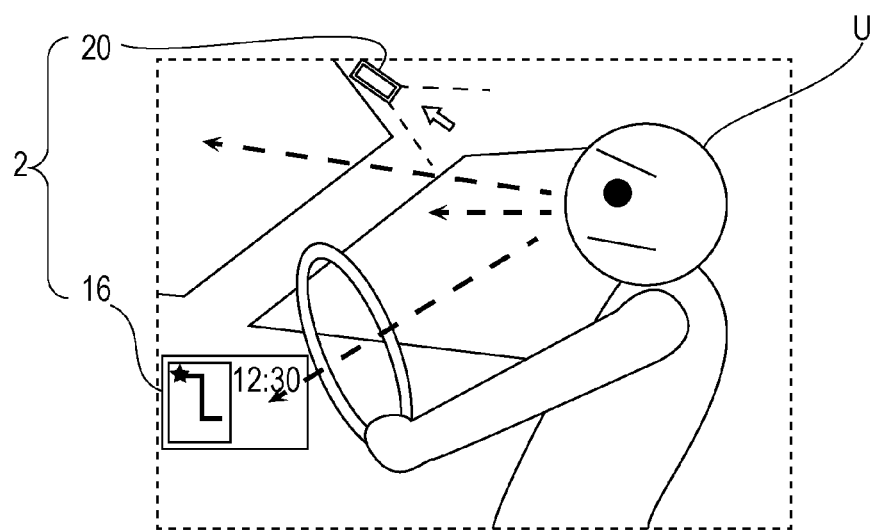
FIG. 3 is a schematic view illustrating a use scene of an information presenting apparatus in a second embodiment.
Figure 4:
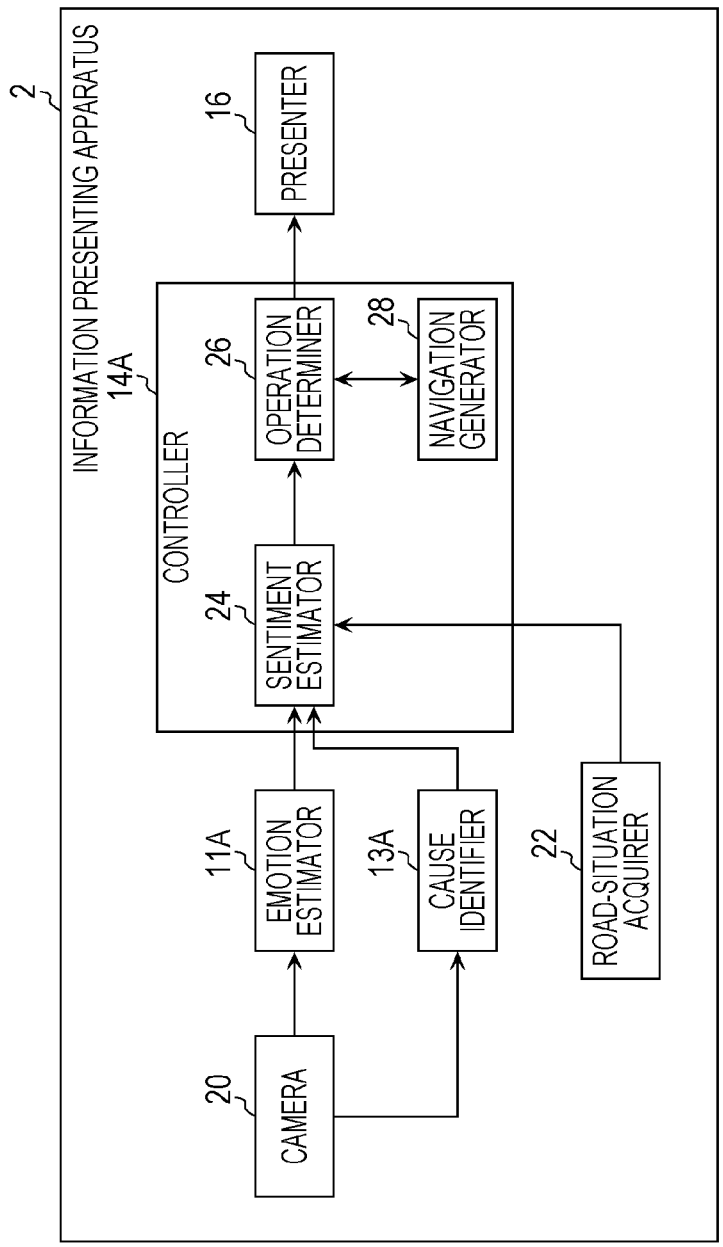
FIG. 4 is a block diagram illustrating functional blocks in the information presenting apparatus in the second embodiment.

FIG. 3 is a schematic view illustrating a use scene of the information presenting apparatus 2 in the present embodiment. FIG. 4 is a block diagram illustrating functional blocks in the information presenting apparatus 2 in the present embodiment.

The information presenting apparatus 2 estimates an emotion of a user U who is a driver as illustrated in FIG. 3, identifies a cause that causes the user U to feel the emotion, on the basis of the direction of the line-of-sight of the user U, and presents appropriate information to the user U. This information may be information for changing the emotion of the user U to a positive emotion when the emotion of the user U is a negative emotion, and may be information for maintaining the emotion of the user U when the emotion is a positive emotion.

As illustrated in FIG. 4, an information presenting apparatus 2 includes an emotion estimator 11A, a cause identifier 13A, a controller 14A, a presenter 16, a camera 20, and a road-situation acquirer 22. The emotion estimator 11A, the cause identifier 13A, the controller 14A, and the camera 20 are specific examples of the emotion estimator 11, the cause identifier 13, the controller 14, and the sensors 10 and 12, respectively, in the information presenting apparatus 1.

The camera 20 is a visible ray camera or infrared camera for capturing an image of the face of the user U (see FIG. 3). The camera 20 serves as a sensor for acquiring an image, which provides a physical quantity.

The emotion estimator 11A is a processor that estimates an emotion felt by the user U, on the basis of a facial expression of the user U in the image acquired by the camera 20 serving as the sensor. Herein, the emotion felt by the user U is assumed to include a positive emotion and a negative emotion. The "positive emotion" as used herein is an emotion indicating a vivid, active state and is specifically an emotion like arousal, excitement, happiness, or the like. The "negative emotion" is an emotion that is opposite to the positive emotion and that indicates a gloomy, inactive state, and is specifically an emotion like anger, sadness, fear, or the like.

The cause identifier 13A is a processor that identifies a cause that causes the user U to feel the emotion estimated by the emotion estimator 11A on the basis of the image acquired by the camera 20 serving as the sensor. More specifically, the cause identifier 13A obtains the direction of the line-of-sight of the user U as the aforementioned cause. For example, the cause identifier 13A extracts the face of the user U in the image acquired by the camera and then analyzes the orientation of the face of the user U and the position(s) of the eyeball(s) to thereby identify the direction of the line-of-sight of the user U. In this case, a thing to which the line-of-sight of the user U is directed is identified as the cause. It is determined that the direction of the line-of-sight is, for example, downward, frontward, or sideward. The downward direction corresponds to a case in which the user U sees a display panel of the navigation apparatus, the frontward direction corresponds to a case in which the user U sees in the traveling direction of the vehicle, and the sideward direction corresponds to a case in which the user U sees a scenery or the front passenger seat. In this case, a known technique can be used for a method for obtaining the direction of the line-of-sight on the basis of the orientation of the face and the position(s) of the eyeball(s) in the image.

The controller 14A is a processor that controls presentation performed by the presenter 16, by using information obtained by executing predetermined processing using the emotion estimated by the emotion estimator 11A and identification information generated by the cause identifier 13A. The controller 14A has an internal configuration including a sentiment estimator 24, an operation determiner 26, and a navigation generator 28.

The sentiment estimator 24 is a processor that estimates a sentiment of the user U. More specifically, the sentiment estimator 24 estimates a sentiment of the user U, on the basis of the emotion of the user U estimated by the emotion estimator 11A, the identification information generation by the cause identifier 13A, and congestion information acquired by the road-situation acquirer 22.

The operation determiner 26 is a processor that determines an operation to be performed by the information presenting apparatus 2 (a navigation apparatus) on the basis of the sentiment of the user U estimated by the sentiment estimator 24. The operation determiner 26 determines an operation, for example, road navigation or sound output, by using an operation determination table T1 held in a memory.

The navigation generator 28 is a processor that generates road navigation information for a vehicle in accordance with control performed by the operation determiner 26. The navigation generator 28 generates navigation information for navigating a road along which the vehicle is going to travel, on the basis of map data held in the information presenting apparatus 2 and current position information obtained by a global positioning system (GPS).

The presenter 16 is an output interface for performing display or sound output of predetermined information in accordance with control performed by the controller 14A. The presenter 16 is, specifically, a liquid-crystal display, which is a display panel of the navigation apparatus.

The road-situation acquirer 22 is a processor that externally acquires information indicating the situation of roads in the surroundings of the vehicle (the situation is also referred to as a "road situation"). The road situation in the surroundings of the vehicle is, specifically, information including the presence/absence of traffic jams on roads in the surroundings of the vehicle, the width of the road on which the vehicle is traveling, landmarks located in the surroundings of the vehicle, and the type of district (such as a business district or a restaurant district) in the surroundings of the vehicle. The road-situation acquirer 22 can acquire congestion information, for example, by using Vehicle Information and Communication System (VICS®). The road-situation acquirer 22 can also acquire information, such as the width of the road, landmarks, and the type of district, on the basis of the map data held in the information presenting apparatus 2 and current position information acquired using a GPS.

Processing performed by the information presenting apparatus 2 configured as described above will be described below.

Figure 5:
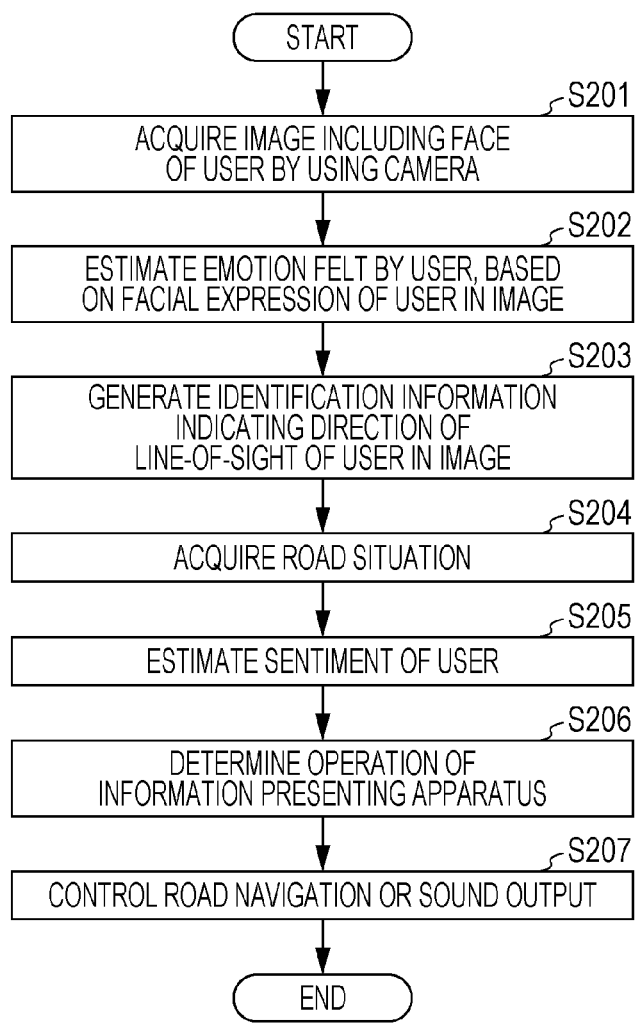
FIG. 5 is a flow diagram illustrating a control method for the information presenting apparatus in the second embodiment.

FIG. 5 is a flow diagram illustrating a control method for the information presenting apparatus 2 in the present embodiment. FIG. 6 illustrates the operation determination table T1 used for determining an operation to be performed by the information presenting apparatus 2 in the present embodiment. The operation of the information presenting apparatus 2 will now be described with reference to FIGS. 5 and 6.

In step S201 in FIG. 5, an image including the face of the user U is acquired through image capture performed by the camera 20.

In step S202, the emotion estimator 11A estimates an emotion felt by the user U, on the basis of a facial expression of the user U in the image acquired by the camera 20.

In step S203, the cause identifier 13A generates identification information that identifies a cause of the emotion of the user U, on the basis of the direction of the line-of-sight of the user U in the image acquired by the camera 20.

In step S204, the road-situation acquirer 22 acquires a road situation in the surroundings of the vehicle.

In step S205, the sentiment estimator 24 estimates a sentiment of the user U, on the basis of the emotion of the user U estimated in step S202, the identification information generated in step S203, and the road situation acquired in step S204 and by using the operation determination table T1 (see FIG. 6).

As illustrated in FIG. 6, in the operation determination table T1, a human driver's sentiment to be estimated and an operation to be determined by the operation determiner 26 are pre-associated with each sets of an emotion (a negative or positive emotion) of the driver, the direction (downward, frontward, or sideward direction) of the line-of-sight of the driver, and a road situation. The downward direction, the frontward direction, and the sideward direction, which are the directions of the line-of-sight of the driver, correspond to the display panel of the navigation apparatus (the presenter 16 in the information presenting apparatus 2), the scene in the traveling direction, and the situation in the surroundings, respectively, and each of the display panel, the scene, and the situation of the surroundings is a cause that causes the emotion of the driver.

For example, a case in which the driver has a negative emotion, the line-of-sight is directed downward, and the road is congested is associated with a sentiment "he or she dislikes traffic jams. Is there another route?" and is also associated with an operation "search for alternative way".

Upon obtaining a set of the emotion of the user U estimated by the emotion estimator 11A, the direction (downward, frontward, or sideward) of the line-of-sight of the user U identified by the cause identifier 13A, and the road situation acquired by the road-situation acquirer 22, the sentiment estimator 24 selects a sentiment associated in the operation determination table T1 with the obtained set to thereby estimate a sentiment of the user U. In the above-described example, the sentiment estimator 24 estimates that the user U has the sentiment "he or she dislikes traffic jams. Is there another route?".

Referring back to FIG. 5, in step S206, the operation determiner 26 determines an operation to be performed by the information presenting apparatus 2, on the basis of the sentiment of the user U estimated in step S205 and by using the operation determination table T1. When the sentiment estimator 24 estimates the sentiment of the user U, the operation determiner 26 selects an operation associated in the operation determination table T1 with the estimated sentiment to thereby determine an operation to be performed by the information presenting apparatus 2. In the above-described example, the operation "search for alternative way" is determined, and the information presenting apparatus 2 finds a less congested route that is different from the route currently navigated by the navigation generator 28 and generates an image for road navigation.

In step S207, on the basis of the operation determined in step S206, the presenter 16 controls image display or sound output for the road navigation as the operation to be performed by the information presenting apparatus 2.

In the operation determination table T1, the driver's sentiment to be estimated and an operation to be determined by the operation determiner 26 may be pre-associated with each set of the emotion of the driver and the direction of the line-of-sight of the driver. That is, the operation determination table T1 may or may not include the road situations. In this case, the sentiment estimator 24 determines an operation on the basis of a set of the emotion and the direction of the line-of-sight. With this arrangement, even when the road-situation acquirer 22 fails to acquire the road situation, it is possible to present appropriate information to the user U.

The sentiment estimator 24 has been described above as determining an operation on the basis of the set of the emotion, the direction of the line-of-sight, and the road information, as described above, and the set may include, for example, the weather at the time of the determination and information obtained by extracting preference of the driver about music that is being played at the time of the determination.

The emotion estimator 11A may estimate not only the emotion of the driver but also the sentiment(s) of the fellow passenger(s). In particular, in a case in which a fellow passenger in the front passenger seat is a person of the opposite gender of the driver, and the driver has a positive emotion and directs his or her consciousness (his or her line-of-sight or conversation) to the front passenger seat, the operation determiner 26 may determine an operation, for example, (a) giving navigation to a route that enables going a long way around or giving navigation to a facility (such as a hotel) where they can spend time together, when the fellow passenger in the front passenger seat has a positive emotion, or (b) selecting a way to go home directly, when the fellow passenger in the front passenger seat has a negative emotion.

The emotion estimator 11A may also estimate an emotion that is different from a positive emotion and a negative emotion. For example, the emotion estimator 11A may determine the degree of arousal and the degree of sleepiness as an emotion. In this case, when the degree of arousal is larger, relaxing music determined by learning may be played, and when the degree of sleepiness is larger, music with which he or she can have a positive emotion, the music being determined by learning, may be played.

The emotion estimator 11A may also estimate an emotion immediately after the vehicle enters a driving state from a parked state for a certain period of time, and the estimated emotion and a facility where the vehicle was parked may be linked to each other so as to allow preference of facilities to be learned, and the degree of customer satisfaction may be fed back to the facility. For example, the emotion estimator 11A may estimate the emotion of the driver when the vehicle comes out of a gas station, and the degree of satisfaction about the gas station may be fed back to the gas station.

Also, the emotion estimator 11A may be utilized for marketing. For example, preference for vehicles may be learned through estimation of the emotions of the drivers in vehicles used in carsharing, and the number of times a vehicle for which a large number of large degrees of satisfaction are obtained is shared may be increased.

As described above, the information presenting apparatus in the present embodiment serves as a vehicle navigation apparatus and presents information obtained based on the emotion of a user and the direction of the line-of-sight of the user. In general, the line-of-sight of the user is directed to a thing that is a cause of the emotion. Hence, not only is the emotion of the user estimated, but also a cause that causes the user to feel the emotion is identified based on the direction of the line-of-sight of the user, thereby making it possible to present more appropriate information, compared with a case in which only the emotion is estimated.

The information presenting apparatus can also present appropriate information to the user, on the basis of not only the emotion of the user and the direction of the line-of-sight but also the road situation.

Third Embodiment

In a third embodiment, an information presenting apparatus and so on that present information more suitable for a user on the basis of an estimated emotion will be described in more detail. An information presenting apparatus 3 in the present embodiment is an example in which the configuration and the processing of the information presenting apparatus 1 in the first embodiment are applied to an apparatus that presents a customer service policy for a user who is going to purchase a product.

Figure 7:
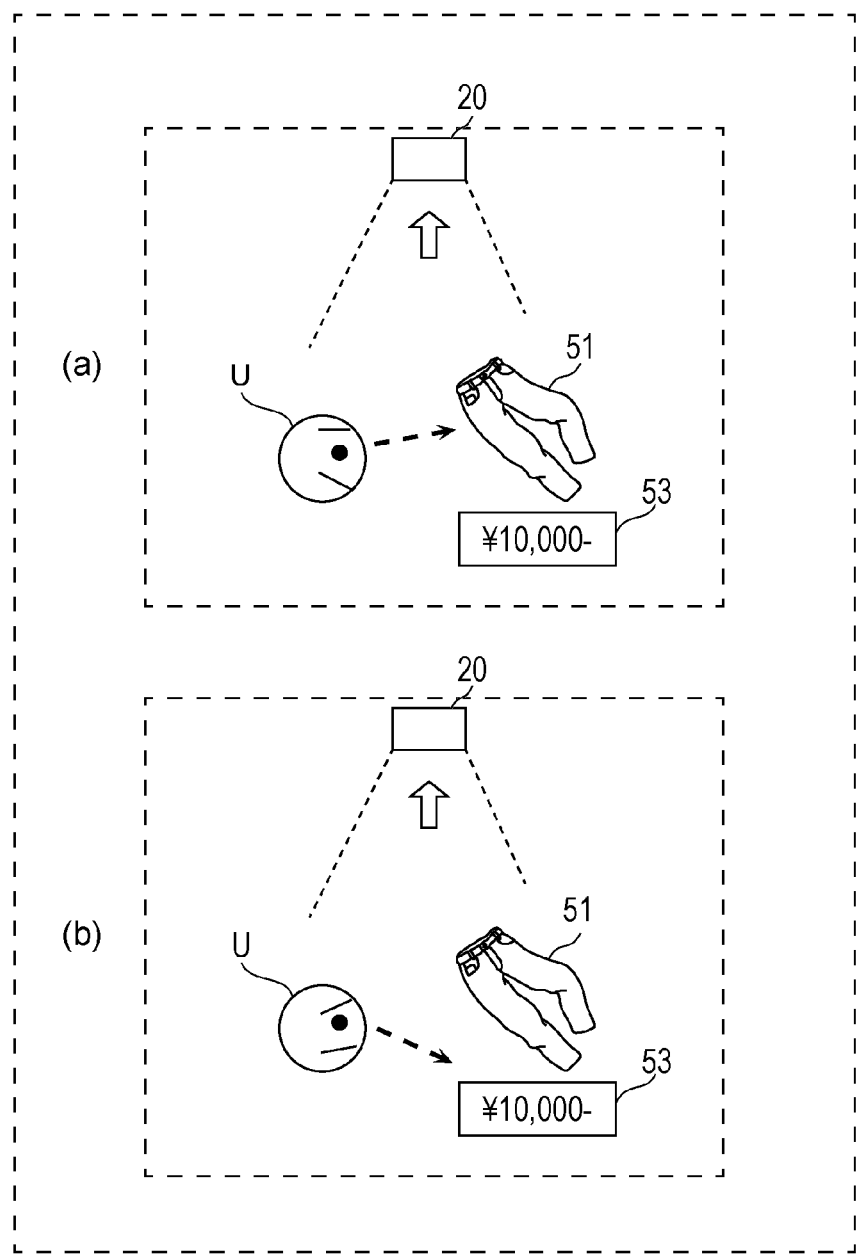
FIG. 7 illustrates schematic diagrams of a use scene of an information presenting apparatus 3 in a third embodiment.
Figure 8:
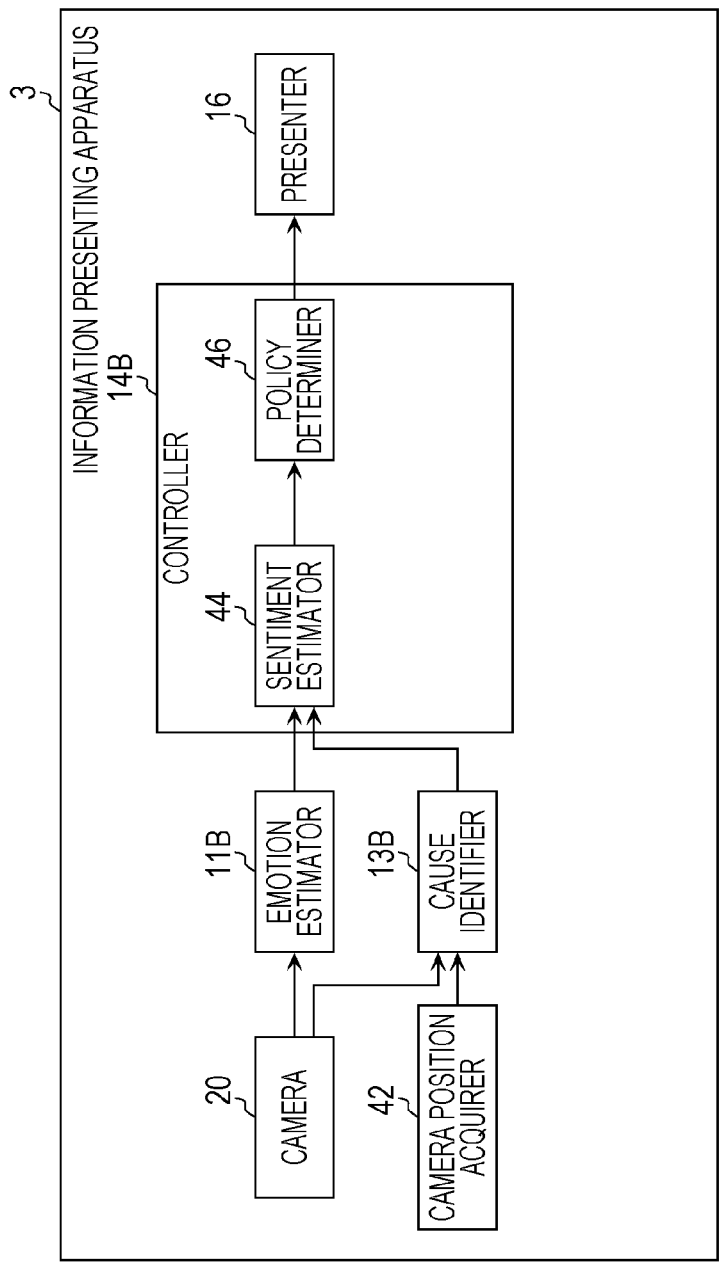
FIG. 8 is a block diagram illustrating functional blocks in the information presenting apparatus in the third embodiment.

FIG. 7 illustrates schematic diagrams of a use scene of the information presenting apparatus 3 in the present embodiment. FIG. 8 is a block diagram illustrating functional blocks in the information presenting apparatus 3 in the present embodiment.

The information presenting apparatus 3 is placed, for example, in a store to estimate, as an emotion, the degree of satisfaction of a user U about a product 51 and the degree of satisfaction of the user U about a price indication 53 attached to the product 51, as illustrated in FIG. 7. On the basis of the estimated degrees of satisfaction, the information presenting apparatus 3 presents, to a sales clerk as a customer service policy, information for prompting the user U to take a purchasing action. That is, when the user U has an emotion "being dissatisfied with the quality or the price of the product 51", the information presenting apparatus 3 presents information for changing the emotion to be closer to satisfaction, and when the user U has an emotion "being satisfied with the quality and the price of the product 51", the information presenting apparatus 3 presents information for making the user U maintain the emotion.

As illustrated in FIG. 8, the information presenting apparatus 3 includes an emotion estimator 11B, a cause identifier 13B, a controller 14B, a presenter 16, a camera 20, and a camera position acquirer 42. The emotion estimator 11B, the cause identifier 13B, the controller 14B, and the camera 20 are specific examples of the emotion estimator 11, the cause identifier 13, the controller 14, and the sensors 10 and 12, respectively, in the information presenting apparatus 1.

The camera 20 is a visible ray camera or infrared camera for capturing an image of the face of the user U (see FIG. 7). The camera 20 serves as a sensor for acquiring an image, which provides a physical quantity.

The camera position acquirer 42 is a processor that acquires, from a memory or outside of the camera position acquirer 42, information indicating the position where the camera 20 is placed.

The emotion estimator 11B is a processor that estimates an emotion felt by the user U on the basis of a facial expression of the user U in the image acquired by the camera 20 serving as the sensor. In the case, the emotion felt by the user U includes the degree of satisfaction about the quality or the price of a product. The degree of satisfaction between dissatisfaction and satisfaction is indicated by, for example, a numerical value between 0 and 1, with the dissatisfaction (i.e., the user U is not satisfied at all) being indicated by 0 and the satisfaction being indicated by 1. A known technique can be used for a method for determining the degree of satisfaction on the basis of a facial expression.

The cause identifier 13B is a processor that identifies a cause that causes the user U to feel the emotion estimated by the emotion estimator 11B on the basis of the image acquired by the camera 20 serving as the sensor. More specifically, the cause identifier 13B obtains the direction of the line-of-sight of the user U from the image acquired by the camera 20, and generates identification information indicating one of the quality and the price of the product, on the basis of whether the product 51 lies on an extension of the line-of-sight of the user U or the price indication 53 for the product 51 lies on an extension of the line-of-sight of the user U. The cause identifier 13B also obtains position information of the position where the camera 20 is placed from the camera position acquirer 42 and identifies to which of a plurality of products (not illustrated) the line-of-sight of the user U is directed.

For example, in a scene illustrated in part (a) of FIG. 7, the emotion estimator 11B estimates that the user U is satisfied with the quality of the product 51 and determines a degree of satisfaction that is relatively close to 1. The cause identifier 13B generates identification information indicating, of the quality and the price of the product, the quality of the product.

Also, for example, in a scene illustrated in part (b) of FIG. 7, the emotion estimator 11B estimates that the user U is not satisfied with the price of the product 51 and determines a degree of satisfaction that is relatively close to 0. The cause identifier 13B generates identification information indicating, of the quality and the price of the product, the price of the product.

The controller 14B is a processor that controls presentation performed by the presenter 16, by using information obtained by executing predetermined processing using the emotion estimated by the emotion estimator 11B and the identification information generated by the cause identifier 13B. The controller 14B has an internal configuration including a sentiment estimator 44 and a policy determiner 46.

The sentiment estimator 44 is a processor that estimates a sentiment of the user U. The sentiment estimator 44 obtains the degrees of satisfaction of the user U about the quality and the price of the product from the emotion estimator 11B and the cause identifier 13B and estimates a sentiment of the user U by using a sentiment table T2 held in the memory.

The policy determiner 46 is a processor that obtains the sentiment of the user U estimated by the sentiment estimator 44 and that determines a customer service policy by using a presentation information table T3 held in the memory.

The presenter 16 is an output interface for performing display or sound output of predetermined information in accordance with control performed by the controller 14B.

Processing performed by the information presenting apparatus 3 configured as described above will be described below.

Figure 13:
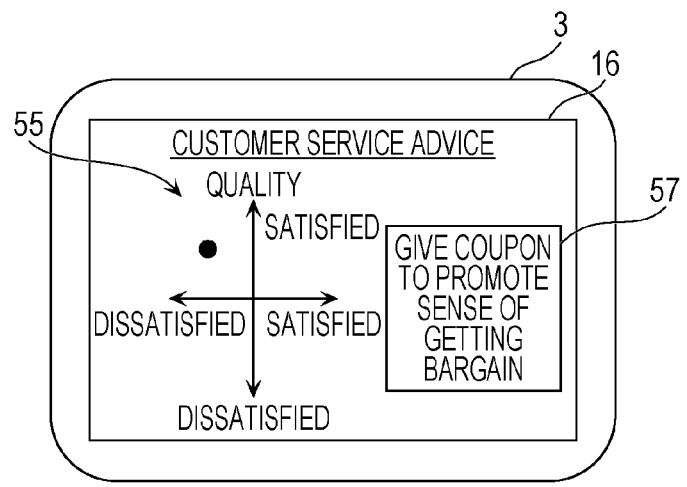
FIG. 13 is a schematic view illustrating one example of presentation of a customer service policy in the third embodiment.

FIG. 9 is a flow diagram illustrating a control method for the information presenting apparatus 3 in the present embodiment. FIG. 10 is a graph illustrating a method for analyzing a customer situation in the present embodiment. FIG. 11 is a table illustrating customer situations in the present embodiment. FIG. 12 is a table illustrating customer service policies in the present embodiment. FIG. 13 is a schematic view illustrating one example of presentation of a customer service policy in the present embodiment. The operation of the information presenting apparatus 3 will now be described with reference to FIGS. 9 to 13.

In step S301 in FIG. 9, an image including the face of the user U is acquired through image capture performed by the camera 20. At this point in time, it is assumed that the line-of-sight of the user U is directed to the product 51 (part (a) of FIG. 7).

In step S302, the cause identifier 13B recognizes that the line-of-sight of the user U is directed to the product 51 on the basis of the image acquired in step S301 and generates identification information indicating the product.

In step S303, the emotion estimator 11B estimates a degree of satisfaction felt by the user U about the quality of the product 51, on the basis of a facial expression of the user U in the image acquired by the camera 20.

In step S304, an image including the face of the user U is acquired through image capture performed by the camera 20. In this case, it is assumed that the line-of-sight of the user U is directed to the price indication 53 (part (b) of FIG. 7).

In step S305, the cause identifier 13B recognizes that the line-of-sight of the user U is directed to the price indication 53, on the basis of the image acquired in step S304, and generates identification information indicating the price indication 53.

In step S306, the emotion estimator 11B estimates a degree of satisfaction felt by the user U about the price of the product, on the basis of a facial expression of the user U in the image acquired by the camera 20.

In step S307, the sentiment estimator 44 estimates a sentiment of the user U (see FIGS. 10 and 11).

FIG. 10 is a graph depicting, on coordinate axes, the degrees of satisfaction of the user U about the quality and the price of a product. Point P indicated by plotting the degree of satisfaction obtained in step S303 on a "product" axis and plotting the degree of satisfaction obtained in step S306 on a "price" axis is associated with the degrees of satisfaction of the user U about the product 51. For example, the degrees of satisfaction of the user U estimated from part (a) and part (b) of FIG. 7 are indicated by point P in FIG. 10.

FIG. 11 illustrates the sentiment table T2 in which the quadrant where point P is located, the quadrant being included in first to fourth quadrants in the graph illustrated in FIG. 10, and the sentiment of the user U are shown pre-associated with each other. For example, the second quadrant where point P is located is associated with the user U having the sentiment "being satisfied with the quality of the product and being dissatisfied with the price of the product".

Referring back to FIG. 9, in step S308, the policy determiner 46 determines a customer service policy on the basis of the sentiment estimated by the sentiment estimator 44 in step S307 to thereby generate presentation information for prompting the user U to take a purchasing action (see FIG. 12).

FIG. 12 illustrates the presentation information table T3 in which the quadrant where point P is located, the quadrant being included in the first to fourth quadrants in the graph illustrated in FIG. 10, and the presentation information for prompting the user U to take a purchasing action are shown pre-associated with each other. For example, point P located in the second quadrant is associated with solving the problem with the price, that is, is associated with a customer service policy for eliminating the dissatisfaction the user U feels about the price. Specifically, in this case, FIG. 12 shows that giving a discount on the product or giving a coupon (discount privilege) is proposed as an effective customer service policy.

Depending on in which of the first to fourth quadrants (illustrated in the graph illustrated in FIG. 10) point P is located, the policy determiner 46 selects the corresponding customer service policy (and a specific example thereof) from the presentation information table T3 to thereby generate presentation information.

Referring back to FIG. 9, in step S309, in accordance with control performed by the controller 14B, the presenter 16 presents the presentation information (see FIG. 13).

FIG. 13 illustrates one example of the presentation information presented by the presenter 16. The presentation information in the example illustrated in FIG. 13 is shown to a sales clerk who is serving the user U. The presenter 16 presents a graph 55 indicating the degrees of satisfaction of the user U about the quality and the price of the product and a character string 57 indicating the customer service policy. This offers some advantages. That is, by viewing the graph 55 presented by the presenter 16, the sales clerk can know the degrees of satisfaction of the user U about the quality and the price of the product, and by viewing the character string 57, the sales clerk can know with what policy the sales clerk should serve the user U in order to prompt the user U to take a purchasing action.

Although the above-description has been given of an example of a scene in which the user U does shopping while actually seeing the actual product 51, the same or similar advantages can also be offered for online shopping performed via an information terminal.

Figure 14:
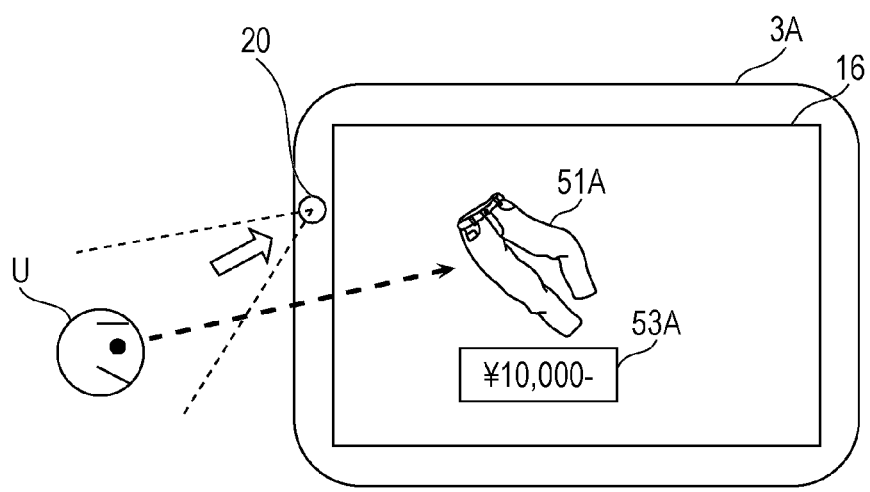
FIG. 14 is a schematic view of a modification of the use scene of the information presenting apparatus in the third embodiment.

FIG. 14 is a schematic view illustrating a modification of the use scene of the information presenting apparatus 3 in the present embodiment.

An information presenting apparatus 3A illustrated in FIG. 14 is an apparatus that has the functions of the information presenting apparatus 3 and that provides an online shopping function to a user U.

The presenter 16 in the information presenting apparatus 3A displays an image 51A of a product 51 and an image 53A of the price indication of the product 51. Also, the camera 20 acquires an image including the face of the user U who is doing online shopping.

In this case, the information presenting apparatus 3A can also know the degrees of satisfaction of the user U about the quality and the price of the product, as in the information presenting apparatus 3. On the basis of the degrees of satisfaction, it is possible to perform processing for prompting the user U to take a purchasing action.

Although the facial expression determination made by the emotion estimator 11B has been described as using feature points in an image, the present disclosure is not limited thereto. Through measurement of a surface temperature of the nose by using an emission thermometer, the emotion estimator 11B may estimate that the user U has a pleasant emotion when the surface temperature increases and may estimate that the user U has an unpleasant emotion when the surface temperature decreases.

Image processing using an infrared camera, other than image processing using a visible ray camera, may be used for the cause identifier 13B to determine the direction of the line-of-sight.

Although the cause identifier 13B has been described as detecting the line-of-sight of the user U to identify a cause, it may also use a gesture, such as touching with a hand of the user U or moving the head of the user U closer.

Also, the sentiment estimator 44 has been described as performing classification based on the four quadrants, that is, the first to fourth quadrants, it may perform finer classification or coarser classification.

Also, although the policy determiner 46 has been described as using product information during determination of the customer service policy, it may use a customer service policy corresponding to a customer situation classified into any of the four quadrants, without using the product information. Also, the target product 51 may be an individual product, such as a certain type of jeans or may be a product category (a clothing category of pants, shirts, jackets, or the like or a product category of products, food, dishes, furniture, or the like).

Also, the customer service policy may be determined by identifying the user U as being a customer in combination with face image authentication and then selecting a product or service to be recommended by using purchase history of this customer.

Also, after identifying the user U as being a customer through face image authentication, a sentiment of the identified customer may be managed by a server on a network in conjunction with the purchase history. This makes it possible to provide a customer service based on an equivalent customer service policy, even when the same customer shows up at another store.

As described above, the information presenting apparatus in the present embodiment serves as as an apparatus for presenting a customer service and presents, to the user, information obtained based on a user's emotion about the quality and the price indication of a product. In general, each user takes a purchasing action when he or she is satisfied with both the quality and the price of a product, and does not take a purchasing action unless he or she is satisfied with at least one of the quality and the price of the product. Accordingly, each user's emotions about both the quality and the price of a product are analyzed, and information for prompting the user to take a purchasing action is generated, thereby offering an advantage in that the possibility that the user purchases the product increases.

Also, on the basis of the degrees of the user's satisfaction about the quality and the price of a product, the information presenting apparatus obtains information that allows the user to be satisfied with the price and/or the product he or she is not satisfied, and provides the obtained information to him or her. This makes it possible to, specifically, prompt the user to take a purchasing action.

Fourth Embodiment

In a fourth embodiment, an information presenting apparatus and so on that present information more suitable for a user on the basis of an estimated emotion will be described in more detail. An information presenting apparatus 4 in the present embodiment is an example in which the configuration and the processing of the information presenting apparatus 1 in the first embodiment are applied to an apparatus that determines a food to be served to a person.

Figure 15:
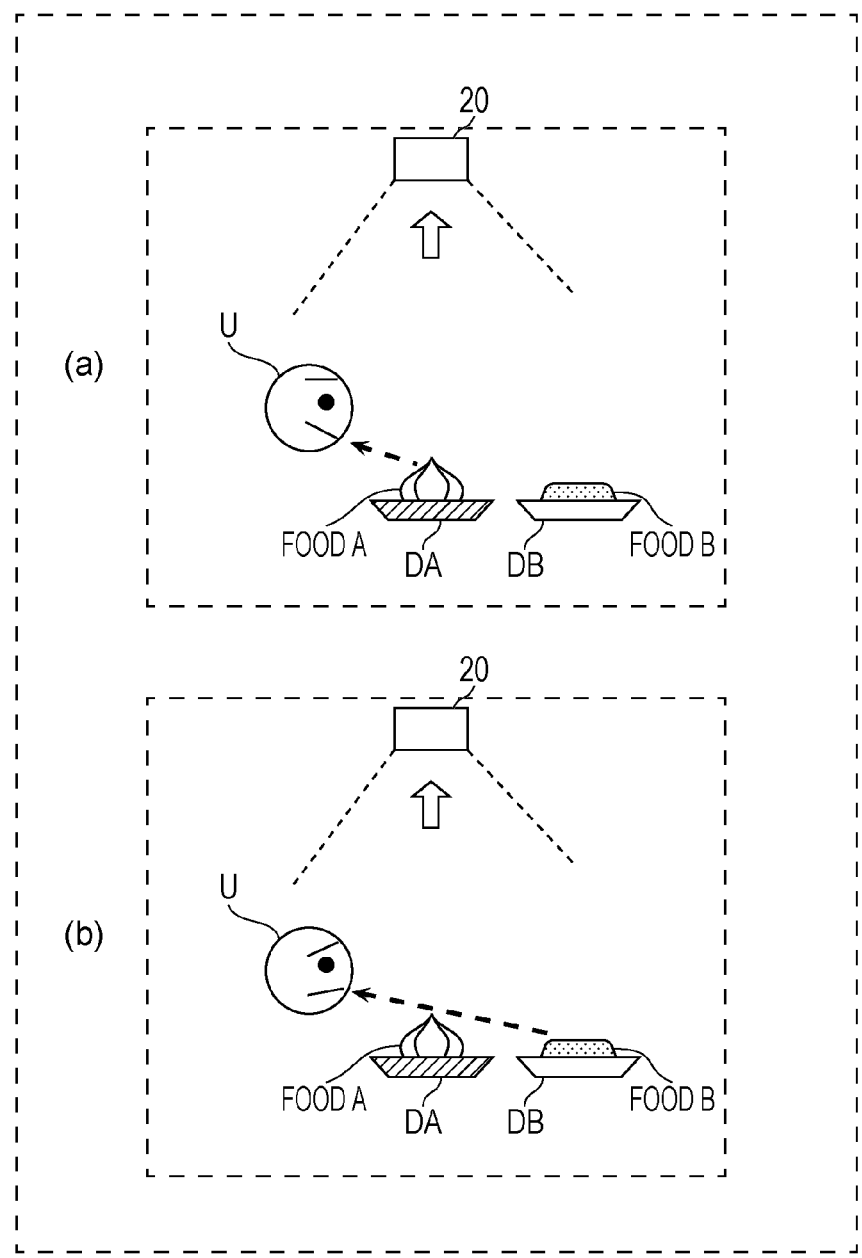
FIG. 15 illustrates schematic diagrams of a use scene of an information presenting apparatus in a fourth embodiment.
Figure 16:
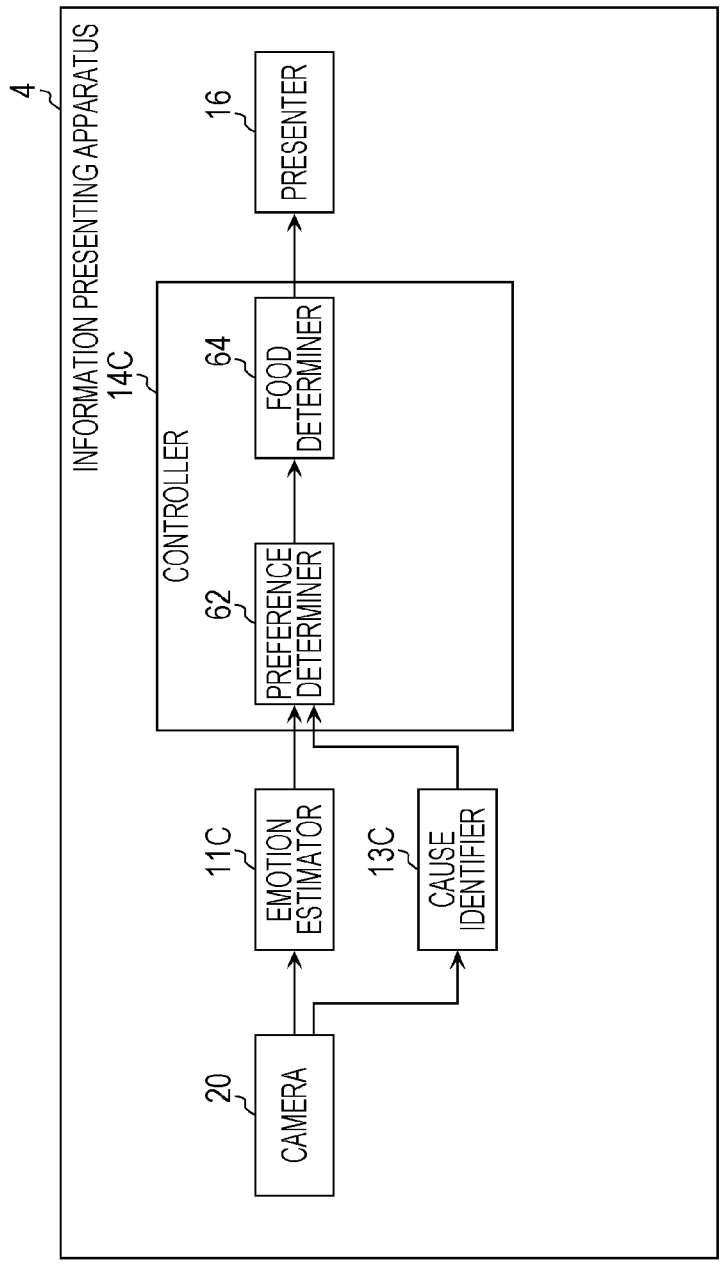
FIG. 16 is a block diagram illustrating functional blocks in the information presenting apparatus in the fourth embodiment.

FIG. 15 illustrates schematic views of a use scene of the information presenting apparatus 4 in the present embodiment. FIG. 16 is a block diagram illustrating functional blocks in the information presenting apparatus 4 in the present embodiment.

The information presenting apparatus 4 estimates, as an emotion, the degree of fondness of a user U when food A and food B as illustrated in FIG. 15 are served to the user while the user U is having a meal. On the basis of the estimated degree of fondness, the information presenting apparatus 4 analyzes food preference of the user U and presents, to a food server, a next recommended food to be served to the user U. That is, by using the next food to be served to the user U, the information presenting apparatus 4 increases the degree of fondness of the user U or maintains the degree of fondness when the degree of fondness is already relatively high.

As illustrated in FIG. 16, the information presenting apparatus 4 includes an emotion estimator 110, a cause identifier 13C, a controller 14C, a presenter 16, and a camera 20. The emotion estimator 110, the cause identifier 13C, the controller 14C, and the camera 20 are specific examples of the emotion estimator 11, the cause identifier 13, the controller 14, and the sensors 10 and 12, respectively, in the information presenting apparatus 1.

The camera 20 is a visible ray camera or infrared camera for capturing an image of the face of the user U (see FIG. 15). The camera 20 serves as a sensor for acquiring an image, which provides a physical quantity. More specifically, the camera 20 performs image capture to acquire an image including the user U, foods A and B, dishes DA and DB in which foods A and B are respectively placed.

The emotion estimator 11C is a processor that estimates an emotion felt by the user U on the basis of a facial expression of the user U in the image acquired by the camera 20 serving as the sensor. In this case, the emotion felt by the user U includes a degree of fondness for a food, such as being fond of the food, the food tasting delicious, or being satisfied with the food. A known technique can be used for a method for determining the degree of fondness on the basis of the facial expression.

The cause identifier 13C is a processor that identifies a cause that causes the user U to feel the emotion estimated by the emotion estimator 11C on the basis of the image acquired by the camera 20 serving as the sensor. More specifically, on the basis of analysis of the image acquired through image capture performed by the camera 20, the cause identifier 13C determines whether the user U brought food A in dish DA to his or her mouth or brought food B in dish DB to his or her mouth. The cause identifier 13C then generates identification information indicating the food (one of foods A and B) the user U brought to his or her mouth. In the image analysis, for example, the colors or shapes of dishes DA and DB and the position of the mouth of the user U are determined, and food Brought to the mouth of the user U is identified based on from which of dishes DA and DB the object was brought to the mouth of the user U.

Through the processing described above, the emotion estimator 11C and the cause identifier 13C estimate the degree of fondness felt by the user U about each of foods A and B and generates identification information indicating food A or B for which the user U had the degree of fondness.

The controller 14C is a processor that controls presentation performed by the presenter 16, by using information obtained by executing predetermined processing using the emotion estimated by the emotion estimator 11C and the identification information generated by the cause identifier 13C. The controller 14C has an internal configuration including a preference determiner 62 and a food determiner 64.

The preference determiner 62 is a processor that determines food preference of the user U. The preference determiner 62 obtains the degrees of fondness of the user U about the respective foods A and B from the emotion estimator 11C and the cause identifier 13C and determines food preference of the user U by using a predetermined determination method based on the obtained degrees of fondness.

The food determiner 64 is a processor that determines a next food to be served to the user U among a plurality of candidates held in a memory by using a predetermined determination method on the basis of the food preference of the user U determined by the preference determiner 62.

The presenter 16 is an output interface for performing display or sound output of predetermined information in accordance with control performed by the controller 14C.

Processing performed by the information presenting apparatus 4 configured as described above will be described below.

Figure 17:
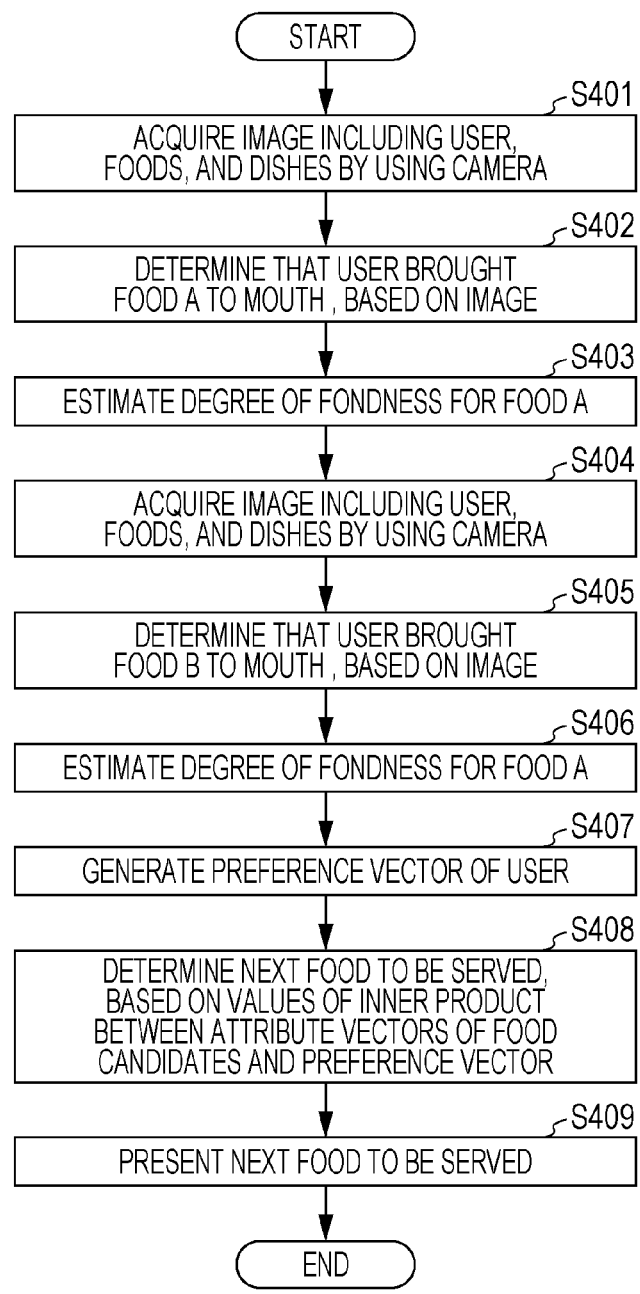
FIG. 17 is a flow diagram illustrating a control method for the information presenting apparatus in the fourth embodiment.
Figure 20:
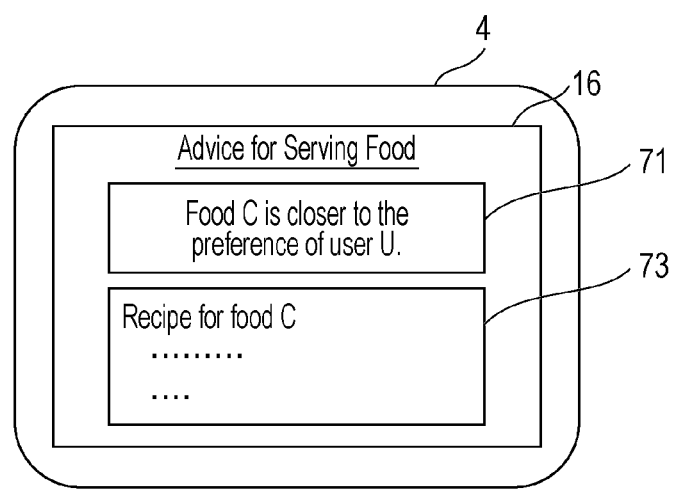
FIG. 20 is a schematic view illustrating one example of presentation of a food in the fourth embodiment.

FIG. 17 is a flow diagram illustrating a control method for the information presenting apparatus 4 in the present embodiment. FIG. 18 is a table for describing a method for deriving a preference vector in the present embodiment. FIG. 19 is a table for describing a method for determining a food in the present embodiment. FIG. 20 is a schematic view illustrating one example of presentation of a food in the present embodiment.

In step S401 in FIG. 17, the camera 20 acquires an image including the user U, foods A and B, and dishes DA and DB. It is assumed that, at this point in time, an image showing a scene in which the user U brings food A from dish DA to his or her mouth (e.g., part (a) of FIG. 15) is acquired.

In step S402, on the basis of the image acquired in step S401, the cause identifier 13C determines that the user U brought food A to his or her mouth. Thus, the cause identifier 13C identifies that a cause that causes the emotion felt by the user U is food A and generates identification information indicating food A.

In step S403, the emotion estimator 11C estimates an emotion felt by the user U, on the basis of a facial expression of the user U in the image acquired in step S401. Since this image shows a scene in which the user U brings food A to his or her mouth, the emotion estimated by the emotion estimator 11C is the emotion the user U feels about food A, more specifically, a fondness for food A.

In steps S404, S405, and S406, in the same manner as described above, the cause identifier 13C and the emotion estimator 11C obtain the degree of fondness of the user U about food B, on the basis of an image acquired by the camera 20, the image showing a scene (e.g., part (b) of FIG. 15) in which the user U brings food B from dish DB to his or her mouth.

In step S407, the preference determiner 62 generates a preference vector representing food preference of the user U (see FIG. 18).

FIG. 18 illustrates a method for deriving a preference vector (a multidimensional vector) of the user U about foods A and B on the basis of the degree of fondness of the user U.

As a premise, it is assumed that the attribute values of respective attributes are pre-defined for foods A and B. The attributes include, for example, an attribute that derives from an ingredient, such as meat or vegetable, of each food and an attribute that derives from taste, such as sweetness or bitterness, of each food. The attribute value of each attribute is an indicator indicating the magnitude of the attribute and takes, for example, a value that is 0 or more and is 1 or less. For example, the attribute of "meat" of a food including a large amount of meat as an ingredient takes a relatively large attribute value (e.g., 0.8). Also, the attribute of "sweetness" of a food having a small amount of sweet takes a relatively small attribute value (e.g., 0.3). A vector whose components are the attributes is referred to as an "attribute vector".

The preference determiner 62 obtains weighted averages of the attribute values of each of foods A and B by using the degrees of fondness for foods A and B, the degrees of fondness being estimated in step S403 and step S406, as weights, to thereby generate a preference vector. The preference vector that is generated is a vector having a number of dimensions which is the same as the number of attributes. The components of the preference vector include the weighted averages of the attribute values. For example, when the attribute values of the attributes "meat" in foods A and B are 0.8 and 0.2, respectively, the degree of fondness of the user U about food A is 0.9, and the degree of fondness of the user U about food B is 0.1, the component "meat" in the preference vector is calculated to be 0.74 (=0.8×0.9+ 0.2×0.1). Other attributes and components are calculated in the same manner. Since each of the components in the preference vector indicates the degree to which the user U has a fondness for each food having the attributes, the preference vector indicates preference of the user U.

Referring back to FIG. 17, in step S408, the food determiner 64 determines a next food to be served to the user U. More specifically, the food determiner 64 determines a next food to be served to the user U on the basis of the values of inner product between the attribute vectors for respective food candidates and the preference vector calculated in step S408 (see FIG. 19).

FIG. 19 illustrates a method for determining a food on the basis of the value of inner product between the attribute vector and the preference vector.

The information presenting apparatus 4 is assumed to have, as a premise, a plurality of food candidates (foods C and D in FIG. 19), which are candidates of a food to be served to the user U. It is assumed that the attribute values of respective attributes are pre-defined for foods C and D, as in the case of foods A and B.

The food determiner 64 generates presentation information that includes, with higher priority, a food having attributes that are closer to the preference of the user U. More specifically, the food determiner 64 obtains the values (in this example, 1.801 and 0.998) of inner products between the preference vector generated in step S407 and attribute vectors for foods C and D. The food determiner 64 then determines a next food to be served to the user U, by selecting, with higher priority, the food (in this example, food C) having the larger inner product value. A large value of the inner product between the preference vector and the attribute vector indicates that the components of the vectors have values that are relatively close to each other, and thus, as a result of making a determination as described above, a food that is close to the preference of the user U is selected from the plurality of food candidates.

Referring back to FIG. 17, in step S409, in accordance with control performed by the controller 14C, the presenter 16 presents the next food to be served to the user U (see FIG. 20), the next food being determined in step S408.

FIG. 20 illustrates one example of the presentation information presented by the presenter 16. The example illustrated in FIG. 20 shows that a character string 71 indicating that the preference of the user U is closer to food C of foods C and D, which are food candidates, and a character string 73 indicating the recipe for food C. Upon seeing these character strings 71 and 73, a food server can think that it is appropriate to serve food C to the user U next and can also know the recipe for serving food C. Only one of the character strings 71 and 73 may be displayed.

Although the emotion estimator 11C has been described as using image processing for the facial expression determination, the present disclosure is not limited thereto. Through measurement of a surface temperature of the nose by using an emission thermometer, the emotion estimator 11C may estimate that the user U has a pleasant emotion when the surface temperature increases and may estimate that the user U has an unpleasant emotion when the surface temperature decreases.

Also, image processing using an infrared camera, other than image processing using a visible ray camera, may be used for the cause identifier 13C to determine the direction of the line-of-sight.

Also, the cause identifier 13C has been described as detecting the line-of-sight of the user U to identify a cause, it may also use a gesture, such as touching with a hand of the user U or moving the head of the user U closer.

Also, although the cause identifier 13C has been described as determining a food by identifying a dish in which the food is placed, the cause identifier 13C may also make the determination by recognizing an object itself that is brought to the mouth of the user U. For example, when the food is ramen, the ingredients thereof are, for example, soup, noodles, Char siu, simmered bamboo shoots, and leek, and thus these five types may be determined based on the shapes and the colors of objects that are brought to the mouth.

Also, the information presenting apparatus 4 can be applied to not only a system that determines a next food to be served but also any system that determines preference of the user U and then recommends a product on the basis of the determined preference. The information presenting apparatus 4 can be applied to a system that presents a product that the user U really wants, for example, by presenting, to the user U, a variety of products on a personal computer and determining the emotion of the user U at this point in time by using video acquired by a camera attached to the personal computer.

In addition, although the above description has been given of a case in which an object for which the degree of fondness, that is, a positive emotion, is relatively large is heavily evaluated (i.e., a weight on the multidimensional vector of the object is increased), conversely, an object for which the degree of fondness is small, that is, a negative emotion is relatively large, may be heavily evaluated. In this case, an object that the user dislikes can be determined. For example, when a study subject that is a cause for which a student has a negative emotion in a classroom is heavily evaluated, a weak subject of the student can be determined, and more effective education can be realized through repetitive explanations on the subject or the like. In this case, the cause identifier 13C cooperates with presentation software and may determine a cause in pages in a presentation to be explained to the student. With this arrangement, a weak subject of the student can be determined using a combination of the pages in the presentation and the emotion of the student.

As described above, the information presenting apparatus in the present embodiment serves as an apparatus for presenting a food to be served to a user, analyzes preference of the user on the basis of the emotion of the user and a food the user brings to his or her mouth, and presents information indicating a food that is relatively close to the preference of the user. Thus, the information presenting apparatus can improve the emotion of the user.

Also, the information presenting apparatus can specifically analyze preference of the user by performing vector computational operation using the attribute values of respective attributes of each food and can determine a food to be served.

Fifth Embodiment

In a fifth embodiment, an information presenting apparatus and so on that present information more suitable for a user on the basis of an estimated emotion will be described in more detail. An information presenting apparatus 5 in the present embodiment is an example in which the configuration and the processing of the information presenting apparatus 1 in the first embodiment are applied to an apparatus that performs information provision (e.g., tour guidance) using a plurality of languages.

Figure 21:
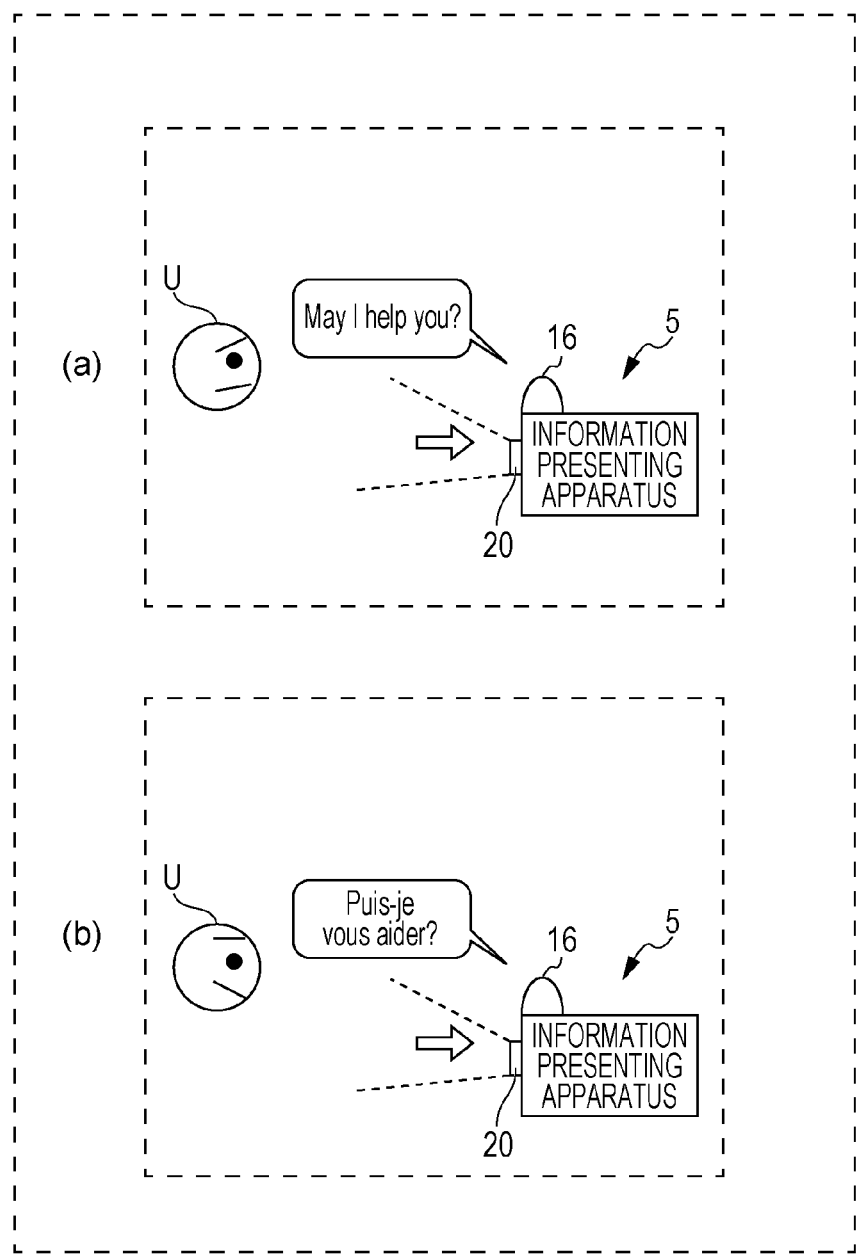
FIG. 21 illustrates schematic diagrams of a use scene of an information presenting apparatus in a fifth embodiment.
Figure 22:
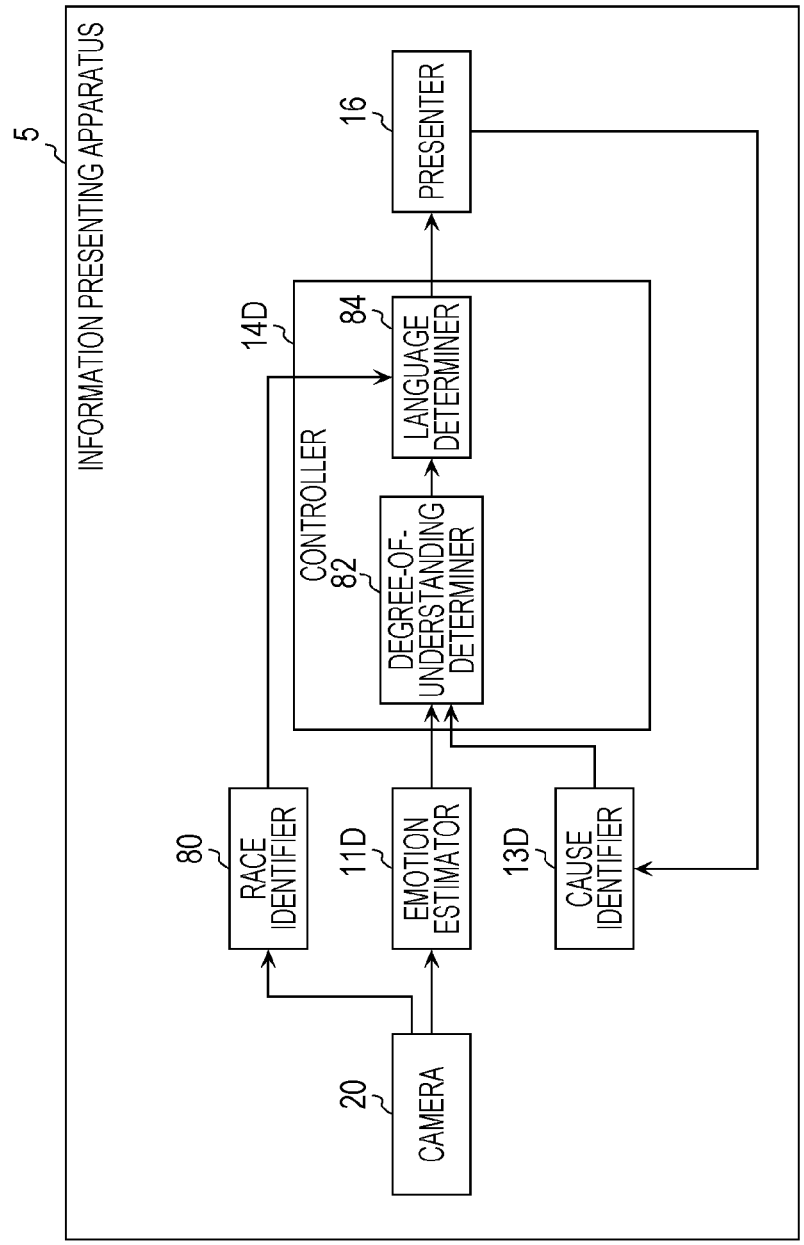
FIG. 22 is a block diagram illustrating functional blocks in the information presenting apparatus in the fifth embodiment.

FIG. 21 illustrates schematic diagrams of a use scene of the information presenting apparatus 5 in the present embodiment. FIG. 22 is a block diagram illustrating functional blocks in the information presenting apparatus 5 in the present embodiment.

As illustrated in FIG. 21, the information presenting apparatus 5 estimates, as an emotion, the degree of understanding of a user U to which speech using each of the plurality of languages is presented. Then, on the basis of the estimated degree of understanding, the information presenting apparatus 5 determines a language the user U can understand and performs information provision using the language the user U can understand. That is, by using the language of information to be provided to the user U, the information presenting apparatus 5 increases the degree of understanding of the user U or maintains the degree of understanding when the degree of understanding is already relatively high.

As illustrated in FIG. 22, the information presenting apparatus 5 includes an emotion estimator 11D, a cause identifier 13D, a controller 14D, a presenter 16, a camera 20, and a race identifier 80. The emotion estimator 11D, the cause identifier 13D, the controller 14D, and the camera 20 are specific examples of the emotion estimator 11, the cause identifier 13, the controller 14, and the sensor 10, respectively, in the information presenting apparatus 1.

The camera 20 is a visible ray camera or infrared camera for capturing an image of the face of the user U (see FIG. 21). The camera 20 serves as a sensor for acquiring an image, which provides a physical quantity. More specifically, the camera 20 performs image capture to acquire an image including the face of the user U.

The emotion estimator 11D is a processor that estimates an emotion felt by the user U on the basis of a facial expression of the user U in the image acquired by the camera 20 serving as the sensor. In this case, the emotion felt by the user U includes the degree of understanding about a language, such as being able to understand the language presented by the presenter 16 or not being able to understand the language presented by the presenter 16. For example, when the degree of understanding is 1, this indicates a state in which the user U understands the language; when the degree of understanding is 0, this indicates a state in which the user U does not understand the language; and the degree of understanding between the states is indicated by a numerical value between 0 and 1. A known technique can be used for a method for determining a degree of understanding on the basis of the facial expression.

The cause identifier 13D is a processor that identifies a cause that causes the user U to feel the emotion estimated by the emotion estimator 11D on the basis of information presented to the user U by the presenter 16. More specifically, the cause identifier 13D obtains, as the cause, the type of language of the speech presented by the presenter 16 and generates information indicating the language type.

The controller 14D is a processor that controls presentation performed by the presenter 16, by using information obtained by executing predetermined processing using the emotion estimated by the emotion estimator 11D and identification information generated by the cause identifier 13D.

The controller 14D has an internal configuration including a degree-of-understanding determiner 82 and a language determiner 84.

The degree-of-understanding determiner 82 is a processor that determines the degree of understanding of the user U about the language of the speech presented by the presenter 16. The degree-of-understanding determiner 82 obtains the degree of understanding estimated by the emotion estimator 11D and also obtains the information indicating the language type from the cause identifier 13D. The degree-of-understanding determiner 82 then determines that the degree of understanding obtained by the emotion estimator 11D is the degree of understanding of the user U about the language of the speech presented by the presenter 16.

The language determiner 84 is a processor that determines whether or not the user U can understand the language presented by the presenter 16 on the basis of whether or not the degree of understanding of the user U which is determined by the degree-of-understanding determiner 82 is larger than a predetermined value. Also, when the language presented by the presenter 16 is a language the user U cannot understand, the language determiner 84 determines the language of the speech to be presented to the user U, by using a language selection table T4 or T5 held in a memory. For determining the language of next speech to be presented to the user U, the language determiner 84 may use the race information obtained from the race identifier 80.

The presenter 16 is an output interface for performing, in the form of speech, information provision using a predetermined language in accordance with control performed by the controller 14D.

The race identifier 80 is a processor that identifies the race of the user U. The race identifier 80 extracts features of the face, body constitution, skin color, and so on of the user U included in an image acquired by the camera 20 and generates race information that identifies the race (a yellow race, white race, or the like) of the user U. The race information generated by the race identifier 80 is provided to the language determiner 84. The race identifier 80 is not an essential constituent element of the information presenting apparatus 5.

Processing performed by the information presenting apparatus 5 configured as described above will be described below.

Figure 23:
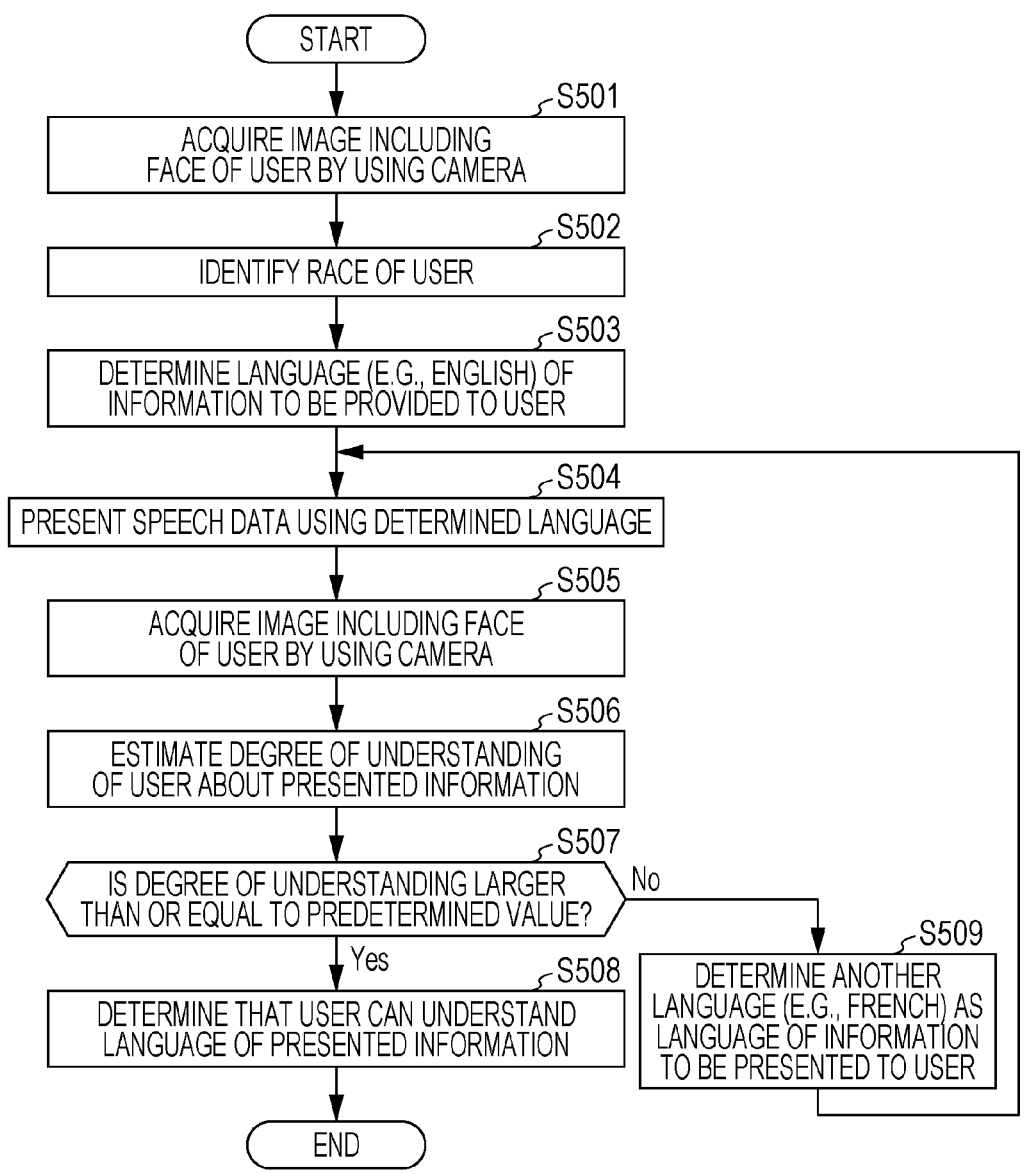
FIG. 23 is a flow diagram illustrating a control method for the information presenting apparatus in the fifth embodiment.

FIG. 23 is a flow diagram illustrating a control method for the information presenting apparatus 5 in the present embodiment. FIG. 24 illustrates the language selection table T4 in the present embodiment.

In step S501, the camera 20 acquires an image including the face of the user U.

In step S502, the race identifier 80 identifies the race of the user U on the basis of the face (more specifically, the positions of feature points of parts, such as the eyes, the mouth, and the nose), body constitution, skin color, and so on of the user U included in the image acquired by the camera 20 and generates race information. In this example, it is assumed that the race of the user U is identified as a white race.

In step S503, upon obtaining the race information from the race identifier 80, the language determiner 84 determines a language of information to be provided to the user U, by selecting one language from a plurality of pre-defined languages as the language spoken by people of the race identified by the race information. A method for determining the language will now be described in detail with reference to FIG. 24.

FIG. 24 illustrates the language selection table T4 used for selecting a language from a plurality of languages. In the language selection table T4, languages that are presumed to be understood by people of corresponding races are shown in a predetermined order according to the respective races. This order may be an arbitrary order. However, for example, when the languages are shown in decreasing order of the number of languages the people of the corresponding races can understand, there is an advantage in that the language the user U can understand can be identified more quickly.

In step S503 described above, the language determiner 84 identifies, in order from top to bottom, the language that is listed in the race information in the language selection table T4 and that corresponds to the race information obtained from the race identifier 80. For example, upon obtaining race information indicating a white race from the race identifier 80, the language determiner 84 selects "English" listed in the language selection table T4.

In step S504, the presenter 16 presents, through speech output, speech data using the language determined in step S503.

In step S505, the camera 20 acquires an image including the face of the user U.

In step S506, on the basis of a facial expression of the user U in the image acquired by the camera 20 in step S505, the emotion estimator 11D and the cause identifier 13D estimate the degree of understanding of the user U about the information presented in step S504.

In step S507, the language determiner 84 determines whether or not the degree of understanding estimated in step S506 is larger than or equal to a predetermined value (e.g., 0.8). If the degree of understanding is larger than or equal to the predetermined value (YES in step S507), the process proceeds to step S508, and if the degree of understanding is smaller than the predetermined value (NO in step S507), the process proceeds to step S509.

In step S508, the language determiner 84 determines that the user U can understand the language of the information presented to the user U in step S504. Thereafter, the language determiner 84 can continue providing the information to the user U by using the language.

In step S509, the language determiner 84 determines another language as the language of the information to be presented to the user U. For determining the other language, the language determiner 84 uses the language selection table T4. After selecting English for the white race in step S503, the language determiner 84 can determine that French listed next to English in the language selection table T4 is a next language of the information to be provided to the user U. Thereafter, the information presenting apparatus 5 returns to step S504 and continues the processing.

Through a series of processes as described above, the information presenting apparatus 5 can determine a language the user U can understand and then can perform information provision using the determined language.

Although the above description has been given of an example in which the table in which the languages are associated with the respective races is used as the language selection table T4, a language selection table T5 in which the languages are not associated with the races may also be used (see FIG. 25). When the language selection table T5 is used, the information presenting apparatus 5 selects a language without identifying the race of the user U. This makes it possible to determine the language of the information to be provided to the user U by using the simpler language selection table T5, and thus there are advantages in that the amount of processing decreases and the power consumed for the processing decreases. In this case, the race identifier 80 and the processing (steps S501 and S502) for identifying the race of the user U are not required.

The above description has been given of a case in which a cause that causes the emotion of the user U is identified by estimating a change in the emotion of the user U which changes after the information presenting apparatus 5 causes an event. In particular, when the user U has a negative emotion after words having no particular meaning, such as words for greeting, are presented, the information presenting apparatus 5 determines that this is a situation in which the user U does not understand the language in the first place, and changes the language to be used.

In this case, the event may be another event. For example, a recommended sightseeing area is presented to a tourist, and a determination is made as to a subsequent facial expression of the tourist. When the tourist has a negative emotion, it is thought that the tourist does not prefer the sightseeing area, and thus another sightseeing area is further recommended. The method using the multidimensional vector in the fourth embodiment can be used as a method for determining preference of a tourist about sightseeing.

The event may not only be an utterance but also be an operation.

In addition, the application of the information presenting apparatus 5 is not limited to information provision for tour guidance. The information presenting apparatus 5 may be applied to a learning robot that estimates an emotion of the user U after the robot utters or operates, that determines whether the emotion is negative or positive, and that learns how the robot behaves in accordance with the preference of the user U.

The information presenting apparatus 5 may also be applied to a biometric authentication system. In this case, the information presenting apparatus 5 learns preference of the user U in advance. The information presenting apparatus 5 uses a change in the emotion based on the preference as one piece of information for biometric authentication of the user U. For example, the information presenting apparatus 5 first narrows down authentication candidates by performing face authentication. Then, in order to check whether or not the user U is truly the person he or she claims to be, the information presenting apparatus 5 presents an image according to the preference of this person. For example, for a person who has a preference of liking cats and disliking dogs, the information presenting apparatus 5 shows a cute cat image to him or her and estimates his or her emotion at this timing. If this person is who he or she claims to be, the information presenting apparatus 5 should estimate a positive emotion. Also, when the information presenting apparatus 5 shows a dog image, it should estimate a negative emotion. Thus, by using the combination of the objects (the dog and the cat) and the emotion, it is possible to determine whether or not a person is who he or she claims to be. This method is superior to the biometric authentication of the related art in that the determination is made not only by using the face but also by further paying attention to inner aspects of mind of the person. A special emotion for the authentication may be pre-determined between the user and the biometric authentication system. For example, a generally unlikely emotional change, such as losing one's temper when an image of a dog is presented, may be pre-determined as an authentication key.

Additionally, application of the information presenting apparatus 5 may be criminal determination at the customs. During criminal detection at the customs, a criminal determination may be made by aggregating what questions cause negative emotions through combination of questions and changes in the emotions after the questions are presented.

In addition, application of the information presenting apparatus 5 may be a social game. When the emotion is positive after the timing when the user meets a character of another user, this means that the user is fond of the character, and thus the game content may be changed so that an event for the two people with the character occurs. Also, display of the character of the user may change in accordance with the fondness for the opponent character. Also, when the emotion at the time of a battle event in the social game is very positive, the capability of the character of the user may improve.

As described above, the information presenting apparatus in the present embodiment serves as an apparatus for performing speech guidance using a plurality of languages, can determine a language that can be understood by a user on the basis of an emotion of the user about a language, and can perform speech guidance. In this case, when the information presenting apparatus uses the estimated emotion of the user about the language presented to the user, it is possible to more appropriately determine the language the user can understand.

The information presenting apparatus can also specifically determine a language the user can understand, on the basis of the degree of understanding of the user about a language.

In each embodiment described above, the individual constituent elements may be constituted by dedicated hardware or may be realized by executing a software program suitable for each constituent element. A program executor, such as a CPU or a processor, may read and execute a software program recorded in a storage medium, such as a hard disk or a semiconductor memory, to thereby realize the constituent elements. Software for realizing the information presenting apparatus in each embodiment described above is, for example, a program as described below.

That is, the program may be a program that causes a computer to execute a control method for the information presenting apparatus, and the control method includes: estimating an emotion felt by a user, based on a physical quantity acquired by a sensor; generating identification information that identifies a cause that causes the user to feel the estimated emotion, based on the physical quantity acquired by the sensor or information that a presenter included in the information presenting apparatus presents to the user; and controlling presentation performed by the information presenting apparatus, by using information obtained by executing predetermined processing using the estimated emotion and the generated identification information.

Although the information presenting apparatus and so on according to one or more aspects have been described above based on the embodiments, the present disclosure is not limited to the embodiments. Modes obtained by applying various modifications conceived by those skilled in the art to the embodiments or modes constituted by combining the constituent elements in different embodiments may also be encompassed by the scope of one or more aspects, as long as such modes do not depart from the spirit and scope of the present disclosure.

The present disclosure can also be used for an information presenting apparatus that presents information more suitable for a user on the basis of an estimated emotion. More specifically, the present disclosure can also be used for a vehicle navigation apparatus, an apparatus for presenting a customer service policy for a customer, an apparatus for determining a food to be served to a person, and an apparatus that performs information provision using a plurality of languages.

What is claimed is:

1. A control method for an information presenting apparatus mounted in a vehicle, the method comprising:
   estimating with a processor of the information presenting apparatus whether an emotion felt by a driver of the vehicle is a positive emotion or a negative emotion, based on a physical quantity acquired by a sensor mounted in the vehicle;
   identifying with the processor based on information from the sensor whether a line-of-sight of the driver is directed to a frontward direction or a sideward direction, wherein the frontward direction indicates that the line-of-sight of the driver is directed to a front of a road on which the vehicle travels, and wherein the sideward direction indicates that the line-of-sight of the driver is directed to a side of the road;
   acquiring with the processor a current road situation on one or more roads outside the vehicle related to the direction of the line-of-sight of the driver when it is identified that the direction of the line-of-sight of the driver is the frontward direction or the sideward direction;
   estimating with the processor a sentiment of the driver based on
     a) the estimated emotion of the driver being the positive emotion or the negative emotion,
     b) the identified direction of the line-of-sight of the driver being the frontward direction or the sideward direction, and
     c) the acquired current road situation;
   determining with the processor an operation to obtain information for maintaining or modifying the estimated emotion felt by the driver, based on
     a) the estimated emotion felt by the driver being the positive emotion or the negative emotion,
     b) the identified direction of the line-of-sight of the driver being the frontward direction or the sideward direction, and
     c) the acquired current road situation; and
   controlling with the processor an output interface of the information presenting apparatus, to present the information for maintaining or modifying the estimated emotion felt by the driver, wherein the information for maintaining or modifying the estimated emotion felt by the driver is obtained by the processor executing the determined operation.

2. The control method according to claim 1,
   wherein, the information presenting apparatus further includes a memory that stores a table including sentiment information pieces indicating sentiments of the driver, and each of the sentiment information pieces is associated with a corresponding combination of (i) an emotion information piece indicating a positive emotion or a negative emotion, (ii) a direction information piece indicating a frontward direction, or a sideward direction and (iii) a road situation information piece indicating one of predetermined road situations,
   wherein, the table further includes operation information pieces indicating operations to be executed by the processor, and each of the operation information pieces is associated with a corresponding combination of (i) the emotion information piece, (ii) the direction information piece and (iii) the road situation information piece, wherein, in the estimating of the sentiment of the driver, the estimated sentiment of the driver is a sentiment indicated by one of the sentiment information pieces included in the table and the one of the sentiment information pieces is associated with a corresponding combination of (i) an emotion information piece indicating the same emotion as the estimated emotion of the driver, (ii) a direction information piece indicating the same direction as the identified direction of the line-of-sight of the driver and (iii) a road situation information piece indicating the same road situation as the acquired current road situation, and wherein, in the determining, the determined operation is an operation indicated by one of the operation information pieces included in the table and the one of the operation information pieces is associated with a corresponding combination of (i) the emotion information piece indicating the same emotion as the estimated emotion of the driver, (ii) the direction information piece indicating the same direction as the identified direction of the line-of-sight of the driver, and (iii) the road situation information piece indicating the same road situation as the acquired current road situation.

3. The control method according to claim 1, wherein the sensor is a camera that acquires an image of the driver as the physical quantity;

the information presenting apparatus is a navigation apparatus;

road navigation or sound output is performed by the navigation apparatus;

in the identifying, the direction of the line-of-sight of the driver is identified based on information that is obtained from the image acquired by the camera.

4. The control method according to claim 3, wherein, road information regarding the road situation is obtained by a processor of the navigation apparatus executing the determined operation.

5. The control method according to claim 1, wherein the output interface includes at least one of a display panel and a speaker.

6. The control method according to claim 2, wherein when the estimated emotion of the driver is the negative emotion, the identified direction of the line-of-sight of the driver is the frontward direction, and the acquired current road situation indicates that congestion occurs on the road ahead of the vehicle, in the estimating of the sentiment of the driver, the sentiment of the driver estimated using the table is that the driver is irritated by the congestion, and the controlling controls the information presenting apparatus to present to the driver information on how long it takes for the congestion to end.

7. The control method according to claim 2, wherein when the estimated emotion of the driver is the negative emotion, the identified direction of the line-of-sight of the driver is the frontward direction, and the acquired current road situation indicates that congestion does not occur on the road ahead of the vehicle, in the estimating of the sentiment of the driver, the sentiment of the driver estimated using the table is that the driver is annoyed by the vehicle ahead, and the controlling controls the information presenting apparatus to present to the driver relaxing music.

8. The control method according to claim 2, wherein when the estimated emotion of the driver is the positive emotion, the identified direction of the line-of-sight of the driver is the frontward direction, and the acquired current road situation indicates that congestion occurs on the road ahead of the vehicle, in the estimating of the sentiment of the driver, the sentiment of the driver estimated using the table is that the driver cannot wait to arrive at a destination of the vehicle, and the controlling controls the information presenting apparatus to present to the driver information about the surroundings of the destination.

9. The control method according to claim 2, wherein when the estimated emotion of the driver is the positive emotion, the identified direction of the line-of-sight of the driver is the frontward direction, and the acquired current road situation indicates that congestion does not occur on the road ahead of the vehicle, in the estimating of the sentiment of the driver, the sentiment of the driver estimated using the table is that the driver is having fun driving, and the controlling controls the information presenting apparatus to learn the driver's preferred roads and to use the preferred roads for next-route searching.

10. The control method according to claim 2, wherein when the estimated emotion of the driver is the negative emotion, the identified direction of the line-of-sight of the driver is the sideward direction, and the acquired current road situation indicates that the road on which the vehicle travels is a five-lane road, in the estimating of the sentiment of the driver, the sentiment of the driver estimated using the table is that the driver is irritated that a lane change cannot be made, and the controlling controls the information presenting apparatus to present to the driver an alert.

11. The control method according to claim 2, wherein when the estimated emotion of the driver is the negative emotion, the identified direction of the line-of-sight of the driver is the sideward direction, and the acquired current road situation indicates that the vehicle is travelling through a restaurant district, in the estimating of the sentiment of the driver, the sentiment of the driver estimated using the table is that the driver is irritated because the driver is hungry, and the controlling controls the information presenting apparatus to present to the driver navigation information to a restaurant.

12. The control method according to claim 2, wherein when the estimated emotion of the driver is the negative emotion, the identified direction of the line-of-sight of the driver is the sideward direction, and the acquired current road situation indicates that the vehicle is not travelling through a restaurant district and the road on which the vehicle travels is not a five-lane road, in the estimating of the sentiment of the driver, the sentiment of the driver estimated using the table is that the driver is irritated for no particular reason, and the controlling controls the information presenting apparatus to present to the driver relaxing music.

13. The control method according to claim 2, wherein when the estimated emotion of the driver is the positive emotion, the identified direction of the line-of-sight of the driver is the sideward direction, and the acquired current road situation indicates that a scenic place is nearby, in the estimating of the sentiment of the driver, the sentiment of the driver estimated using the table is that the driver would have fun to see the scenic place, and the controlling controls the information presenting apparatus to present to the driver information about the scenic place and to learn the driver's preferred scenic places.

14. A control method for an information presenting apparatus, the method comprising:

estimating an emotion felt by a user, based on a physical quantity acquired by a sensor;

generating, by a processor, identification information that identifies a cause that causes the user to feel the estimated emotion, based on the physical quantity acquired by the sensor or information presented to the user by an output interface of the information presenting apparatus; and controlling, by the processor, the output interface of the information presenting apparatus, to present information for maintaining or modifying the estimated emotion felt by the user, the information for maintaining or modifying the estimated emotion felt by the user being obtained by executing a predetermined processing using the estimated emotion and the cause identified by the generated identification information, wherein the information for maintaining or modifying the estimated emotion felt by the user includes content different from the information forming the basis for generating the identification information, wherein the cause is a piece of speech data using a first language, the piece of speech data being presented to the user by the output interface through speech output;

in the estimating,
a degree of understanding indicated by the user about the piece of speech data using the first language presented as the information forming the basis for generating the identification information by the output interface is estimated as the emotion;

in the generating,
information that identifies the first language of the piece of speech data presented by the output interface is generated as the identification information;

in the executing of the predetermined processing,
when the estimated degree of understanding is smaller than a predetermined degree, a piece of speech data using a second language different from the first language is obtained as the information for modifying the estimated emotion felt by the user; and in the controlling,
the output interface is controlled to present the obtained piece of speech data using the second language through speech output.

15. The control method according to claim 14,
wherein the piece of speech data using the first language is a piece of speech guidance data using the first language, and the piece of speech data using the second language is a piece of speech guidance data using the second language, wherein the information presenting apparatus has a memory in which the piece of speech guidance data using the first language, and the piece of speech guidance data using the second language are stored; and in the executing of the predetermined processing,
(a) when the estimated degree of understanding about the piece of speech guidance data using the first language is smaller than a predetermined degree, the piece of speech guidance data using the second language is selected and obtained as the information for modifying the estimated emotion felt by the user from the memory, and
(b) when the estimated degree of understanding about the piece of speech guidance data using the first language is larger than or equal to the predetermined degree, it is determined that a speech guidance data using the first language as the speech output of the output interface can be understood by the user.

16. An information presenting apparatus mounted in a vehicle comprising:
a processor; and
a memory that stores a program,
wherein the program causes the processor to execute:
estimating whether an emotion felt by a driver of the vehicle is a positive emotion or a negative emotion, based on a physical quantity acquired by a sensor mounted in the vehicle;
identifying, based on information from the sensor, whether a line-of-sight of the driver is directed to a frontward direction or a sideward direction, wherein the frontward direction indicates that the line-of-sight of the driver is directed to a front of a road on which the vehicle travels, and wherein the sideward direction indicates that the line-of-sight of the driver directs to a side of the road and wherein the downward direction indicates that the line-of-sight of the driver directs to a display panel of the information presenting apparatus;
acquiring a current road situation on one or more roads outside the vehicle related to the direction of the line-of-sight of the driver when it is identified that the direction of the line-of-sight of the driver is the frontward direction or the sideward direction;
estimating a sentiment of the driver based on
a) the estimated emotion of the driver being the positive emotion or the negative emotion,
b) the identified direction of the line-of-sight of the driver being the frontward direction or the sideward direction, and
c) the acquired current road situation;
determining an operation to obtain information for maintaining or modifying the estimated emotion felt by the driver, based on
a) the estimated emotion felt by the driver being the positive emotion or the negative emotion,
b) the identified direction of the line-of-sight of the driver being the frontward direction or the sideward direction, and
c) the acquired current road situation; and
controlling an output interface of the information presenting apparatus, to present the information for maintaining or modifying the estimated emotion felt by the driver, wherein the information for maintaining or modifying the estimated emotion felt by the driver is obtained by the processor executing the determined operation.

* * * * *